United States Patent
Kuno et al.

(10) Patent No.: US 7,643,074 B2
(45) Date of Patent: Jan. 5, 2010

(54) PIXEL SIGNAL PROCESSING APPARATUS AND PIXEL SIGNAL PROCESSING METHOD

(75) Inventors: Tetsuya Kuno, Tokyo (JP); Junko Makita, Tokyo (JP); Hiroaki Sugiura, Tokyo (JP); Narihiro Matoba, Tokyo (JP); Masashi Tamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 651 days.

(21) Appl. No.: 10/584,945

(22) PCT Filed: Jul. 1, 2005

(86) PCT No.: PCT/JP2005/012191

§ 371 (c)(1),
(2), (4) Date: Jul. 5, 2006

(87) PCT Pub. No.: WO2006/059409

PCT Pub. Date: Jun. 8, 2006

(65) Prior Publication Data

US 2009/0109296 A1    Apr. 30, 2009

(30) Foreign Application Priority Data

Dec. 2, 2004   (JP) .............................. 2004-349818

(51) Int. Cl.
*H04N 3/14* (2006.01)
*H04N 5/335* (2006.01)
*H04N 9/04* (2006.01)
*H04N 9/083* (2006.01)

(52) U.S. Cl. ...................... 348/280; 382/300

(58) Field of Classification Search ............... 348/280; 382/300

See application file for complete search history.

(56) References Cited

U.S. PATENT DOCUMENTS

| 4,630,307 A | 12/1986 | Cok |
| 4,642,678 A | 2/1987 | Cok |
| 5,373,322 A | 12/1994 | Laroche et al. |
| 5,382,976 A | 1/1995 | Hibbard |
| 6,091,862 A * | 7/2000 | Okisu .................. 382/300 |
| 6,721,003 B1 * | 4/2004 | Tsuruoka et al. ......... 348/240.2 |
| 2002/0047907 A1 | 4/2002 | Chen et al. |

FOREIGN PATENT DOCUMENTS

| JP | 11168744 A | 6/1999 |
| JP | 2001078211 A | 3/2001 |
| JP | 2001197512 A | 7/2001 |
| JP | 2002152762 A | 5/2002 |
| JP | 2003259383 A | 9/2003 |
| JP | 2003348608 A | 12/2003 |
| JP | 2004159176 A | 6/2004 |
| JP | 2005217478 A | 8/2005 |

* cited by examiner

*Primary Examiner*—Timothy J Henn
*Assistant Examiner*—Dennis Hogue
(74) *Attorney, Agent, or Firm*—Birch, Stewart, Kolasch & Birch, LLP

(57) ABSTRACT

The difference between the output of a k-signal nonlinear low-pass filter (8g) and the output of an h-signal nonlinear low-pass filter (8r) is added (44) to the value of the h-th pixel signal (h(i, j)) at the pixel position of interest to obtain the k-th pixel signal (k(i, j)) at the pixel position of interest. Accurate pixel interpolation can be performed with good noise immunity, even at locations where the color signals are uncorrelated.

12 Claims, 21 Drawing Sheets

FIG.2

|   | i−3 | i−2 | i−1 | i | i+1 | i+2 | i+3 |
|---|---|---|---|---|---|---|---|
| j−3 | R | G | R | G | R | G | R |
| j−2 | G | B | G | B | G | B | G |
| j−1 | R | G | R | G | R | G | R |
| j | G | B | G | B | G | B | G |
| j+1 | R | G | R | G | R | G | R |
| j+2 | G | B | G | B | G | B | G |
| j+3 | R | G | R | G | R | G | R |

FIG.3

|   | i−3 | i−2 | i−1 | i | i+1 | i+2 | i+3 |
|---|---|---|---|---|---|---|---|
| j−3 | R |   | R |   | R |   | R |
| j−2 |   |   |   |   |   |   |   |
| j−1 | R |   | R |   | R |   | R |
| j |   |   |   |   |   |   |   |
| j+1 | R |   | R |   | R |   | R |
| j+2 |   |   |   |   |   |   |   |
| j+3 | R |   | R |   | R |   | R |

FIG.4

|     | i−3 | i−2 | i−1 | i | i+1 | i+2 | i+3 |
|-----|-----|-----|-----|---|-----|-----|-----|
| j−3 |     | G   |     | G |     | G   |     |
| j−2 | G   |     | G   |   | G   |     | G   |
| j−1 |     | G   |     | G |     | G   |     |
| j   | G   |     | G   |   | G   |     | G   |
| j+1 |     | G   |     | G |     | G   |     |
| j+2 | G   |     | G   |   | G   |     | G   |
| j+3 |     | G   |     | G |     | G   |     |

FIG.5

|     | i−3 | i−2 | i−1 | i | i+1 | i+2 | i+3 |
|-----|-----|-----|-----|---|-----|-----|-----|
| j−3 |     |     |     |   |     |     |     |
| j−2 |     | B   |     | B |     | B   |     |
| j−1 |     |     |     |   |     |     |     |
| j   |     | B   |     | B |     | B   |     |
| j+1 |     |     |     |   |     |     |     |
| j+2 |     | B   |     | B |     | B   |     |
| j+3 |     |     |     |   |     |     |     |

FIG.6

|     | i-3 | i-2 | i-1 | i | i+1 | i+2 | i+3 |
|-----|-----|-----|-----|-----|-----|-----|-----|
| j-3 | RNF | RNF | RNF | RNF | RNF | RNF | RNF |
| j-2 | RNF | RNF | RNF | RNF | RNF | RNF | RNF |
| j-1 | RNF | RNF | RNF | RNF | RNF | RNF | RNF |
| j   | RNF | RNF | RNF | RNF | RNF | RNF | RNF |
| j+1 | RNF | RNF | RNF | RNF | RNF | RNF | RNF |
| j+2 | RNF | RNF | RNF | RNF | RNF | RNF | RNF |
| j+3 | RNF | RNF | RNF | RNF | RNF | RNF | RNF |

FIG.7

|     | i-3 | i-2 | i-1 | i | i+1 | i+2 | i+3 |
|-----|-----|-----|-----|-----|-----|-----|-----|
| j-3 | GNF | GNF | GNF | GNF | GNF | GNF | GNF |
| j-2 | GNF | GNF | GNF | GNF | GNF | GNF | GNF |
| j-1 | GNF | GNF | GNF | GNF | GNF | GNF | GNF |
| j   | GNF | GNF | GNF | GNF | GNF | GNF | GNF |
| j+1 | GNF | GNF | GNF | GNF | GNF | GNF | GNF |
| j+2 | GNF | GNF | GNF | GNF | GNF | GNF | GNF |
| j+3 | GNF | GNF | GNF | GNF | GNF | GNF | GNF |

|  | i−3 | i−2 | i−1 | i | i+1 | i+2 | i+3 |
|---|---|---|---|---|---|---|---|
| j−3 | BNF | BNF | BNF | BNF | BNF | BNF | BNF |
| j−2 | BNF | BNF | BNF | BNF | BNF | BNF | BNF |
| j−1 | BNF | BNF | BNF | BNF | BNF | BNF | BNF |
| j | BNF | BNF | BNF | BNF | BNF | BNF | BNF |
| j+1 | BNF | BNF | BNF | BNF | BNF | BNF | BNF |
| j+2 | BNF | BNF | BNF | BNF | BNF | BNF | BNF |
| j+3 | BNF | BNF | BNF | BNF | BNF | BNF | BNF |

FIG.12

|  | i−3 | i−2 | i−1 | i | i+1 | i+2 | i+3 |
|---|---|---|---|---|---|---|---|
| j−3 |  | G |  | G |  | G |  |
| j−2 | G |  | G |  | G |  | G |
| j−1 |  | G |  | G |  | G |  |
| j | G |  | G |  | G |  | G |
| j+1 |  | G |  | G |  | G |  |
| j+2 | G |  | G |  | G |  | G |
| j+3 |  | G |  | G |  | G |  |

FIG.13

|  | i−5 | i−4 | i−3 | i−2 | i−1 | i | i+1 | i+2 | i+3 |
|---|---|---|---|---|---|---|---|---|---|
| j−4 | G |  | G |  | G |  | G |  | G |
| j−3 |  | G |  | G |  | G |  | G |  |
| j−2 | G |  | G |  | G |  | G |  | G |
| j−1 |  | G |  | G |  | G |  | G |  |
| j | G |  | G |  | G |  | G |  | G |
| j+1 |  | G |  | G |  | G |  | G |  |
| j+2 | G |  | G |  | G |  | G |  | G |
| j+3 |  | G |  | G |  | G |  | G |  |
| j+4 | G |  | G |  | G |  | G |  | G |

|   | i−3 | i−2 | i−1 | i | i+1 | i+2 | i+3 | i+4 |
|---|---|---|---|---|---|---|---|---|
| j−3 | R |   | R |   | R |   | R |   |
| j−2 |   |   |   |   |   |   |   |   |
| j−1 | R |   | R |   | R |   | R |   |
| j |   |   |   |   |   |   |   |   |
| j+1 | R |   | R |   | R |   | R |   |
| j+2 |   |   |   |   |   |   |   |   |
| j+3 | R |   | R |   | R |   | R |   |
| j+4 |   |   |   |   |   |   |   |   |

FIG.17

|   | i−4 | i−3 | i−2 | i−1 | i | i+1 | i+2 | i+3 |
|---|---|---|---|---|---|---|---|---|
| j−3 |   | R |   | R |   | R |   | R |
| j−2 |   |   |   |   |   |   |   |   |
| j−1 |   | R |   | R |   | R |   | R |
| j |   |   |   |   |   |   |   |   |
| j+1 |   | R |   | R |   | R |   | R |
| j+2 |   |   |   |   |   |   |   |   |
| j+3 |   | R |   | R |   | R |   | R |
| j+4 |   |   |   |   |   |   |   |   |

FIG.18

|  | i−3 | i−2 | i−1 | i | i+1 | i+2 | i+3 | i+4 |
|---|---|---|---|---|---|---|---|---|
| j−3 | | | | | | | | |
| j−2 | | B | | B | | B | | B |
| j−1 | | | | | | | | |
| j | | B | | B | | B | | B |
| j+1 | | | | | | | | |
| j+2 | | B | | B | | B | | B |
| j+3 | | | | | | | | |
| j+4 | | B | | B | | B | | B |

FIG.19

|  | i−4 | i−3 | i−2 | i−1 | i | i+1 | i+2 | i+3 |
|---|---|---|---|---|---|---|---|---|
| j−3 | | | | | | | | |
| j−2 | B | | B | | B | | B | |
| j−1 | | | | | | | | |
| j | B | | B | | B | | B | |
| j+1 | | | | | | | | |
| j+2 | B | | B | | B | | B | |
| j+3 | | | | | | | | |
| j+4 | B | | B | | B | | B | |

FIG.20

|   | i-3 | i-2 | i-1 | i | i+1 | i+2 | i+3 | i+4 |
|---|---|---|---|---|---|---|---|---|
| j-3 |   |   |   |   |   |   |   |   |
| j-2 |   | B |   | B |   | B |   | B |
| j-1 |   |   |   |   |   |   |   |   |
| j   |   | B |   | B |   | B |   | B |
| j+1 |   |   |   |   |   |   |   |   |
| j+2 |   | B |   | B |   | B |   | B |
| j+3 |   |   |   |   |   |   |   |   |
| j+4 |   | B |   | B |   | B |   | B |

FIG.21

|   | i-4 | i-3 | i-2 | i-1 | i | i+1 | i+2 | i+3 |
|---|---|---|---|---|---|---|---|---|
| j-3 |   |   |   |   |   |   |   |   |
| j-2 | B |   | B |   | B |   | B |   |
| j-1 |   |   |   |   |   |   |   |   |
| j   | B |   | B |   | B |   | B |   |
| j+1 |   |   |   |   |   |   |   |   |
| j+2 | B |   | B |   | B |   | B |   |
| j+3 |   |   |   |   |   |   |   |   |
| j+4 | B |   | B |   | B |   | B |   |

FIG.29

|     | i−3 | i−2 | i−1 | i   | i+1 | i+2 | i+3 |
|-----|-----|-----|-----|-----|-----|-----|-----|
| j−3 | gr  | G   | gr  | G   | gr  | G   | gr  |
| j−2 | G   | gb  | G   | gb  | G   | gb  | G   |
| j−1 | gr  | G   | gr  | G   | gr  | G   | gr  |
| j   | G   | gb  | G   | gb  | G   | gb  | G   |
| j+1 | gr  | G   | gr  | G   | gr  | G   | gr  |
| j+2 | G   | gb  | G   | gb  | G   | gb  | G   |
| j+3 | gr  | G   | gr  | G   | gr  | G   | gr  |

FIG.30

|     | i−3 | i−2 | i−1 | i   | i+1 | i+2 | i+3 |
|-----|-----|-----|-----|-----|-----|-----|-----|
| j−3 | R   | rg  | R   | rg  | R   | rg  | R   |
| j−2 | rg  |     | rg  |     | rg  |     | rg  |
| j−1 | R   | rg  | R   | rg  | R   | rg  | R   |
| j   | rg  |     | rg  |     | rg  |     | rg  |
| j+1 | R   | rg  | R   | rg  | R   | rg  | R   |
| j+2 | rg  |     | rg  |     | rg  |     | rg  |
| j+3 | R   | rg  | R   | rg  | R   | rg  | R   |

FIG.31

|     | i−3 | i−2 | i−1 | i   | i+1 | i+2 | i+3 |
|-----|-----|-----|-----|-----|-----|-----|-----|
| j−3 |     | bg  |     | bg  |     | bg  |     |
| j−2 | bg  | B   | bg  | B   | bg  | B   | bg  |
| j−1 |     | bg  |     | bg  |     | bg  |     |
| j   | bg  | B   | bg  | B   | bg  | B   | bg  |
| j+1 |     | bg  |     | bg  |     | bg  |     |
| j+2 | bg  | B   | bg  | B   | bg  | B   | bg  |
| j+3 |     | bg  |     | bg  |     | bg  |     |

FIG.32

|  | i−3 | i−2 | i−1 | i | i+1 | i+2 | i+3 |
|---|---|---|---|---|---|---|---|
| j−3 | R | rg | R | rg | R | rg | R |
| j−2 | rg | rb | rg | rb | rg | rb | rg |
| j−1 | R | rg | R | rg | R | rg | R |
| j | rg | rb | rg | rb | rg | rb | rg |
| j+1 | R | rg | R | rg | R | rg | R |
| j+2 | rg | rb | rg | rb | rg | rb | rg |
| j+3 | R | rg | R | rg | R | rg | R |

FIG.33

|  | i−3 | i−2 | i−1 | i | i+1 | i+2 | i+3 |
|---|---|---|---|---|---|---|---|
| j−3 | br | bg | br | bg | br | bg | br |
| j−2 | bg | B | bg | B | bg | B | bg |
| j−1 | br | bg | br | bg | br | bg | br |
| j | bg | B | bg | B | bg | B | bg |
| j+1 | br | bg | br | bg | br | bg | br |
| j+2 | bg | B | bg | B | bg | B | bg |
| j+3 | br | bg | br | bg | br | bg | br |

PIXEL SIGNAL PROCESSING APPARATUS AND PIXEL SIGNAL PROCESSING METHOD

FIELD OF THE INVENTION

The present invention relates to a pixel signal processing apparatus and method, more particularly to a pixel signal processing apparatus and method that, based on a group of pixel signals of pixels obtained from a two-dimensional plane array of pixel positions each having one of a plurality of spectral sensitivity characteristics, generates, for a pixel position of interest at which there is a pixel signal having one of those spectral sensitivity characteristics, pixel signals (referred to below as color signals) of the other spectral sensitivity characteristics.

This type of pixel signal processing apparatus is used as part of a color imaging apparatus that also includes a color imaging device having multiple types of photoelectric conversion elements arrayed on a two-dimensional plane, each having one of a plurality of spectral sensitivity characteristics, such as the three spectral sensitivity characteristics or colors red (R), green (G), and blue (B), for example, a Bayer array of imaging devices (image sensors), to interpolate color signals that are lacking at each pixel position in the pixel signals output from the image sensors.

BACKGROUND ART

In conventional imaging apparatus having image sensors with a Bayer array of red, green, and blue color filters, in which each pixel lacks the green and blue, blue and red, or red and green color component values, interpolation is performed to increase the sense of resolution by replacing the pixel signal of each pixel with a mean value based on the local distribution of pixel signals for each color, thereby employing an interpolation method based on an assumed linear similarity between the known color geometry and the missing color geometry, as shown, for example, in Patent Document 1 below.

Patent Document 1: Japanese Patent Application Publication No. 2000-197512 (paragraphs 0048 to 0049, FIG. 7)

DISCLOSURE OF THE INVENTION

Problems to be Solved by the Invention

This conventional method assumes a strong positive correlation among the color component values (e.g., the red, green, and blue component values in a Bayer array) in a neighborhood of the pixel to be interpolated. A consequent problem is that interpolation cannot be carried out properly in a region where there is no positive correlation between color component values (a boundary between one color and another color, for example), including both cases of no correlation and cases of negative correlation, which leads to large interpolation errors.

Another problem is that when noise is added to the signals, since the correlation between the signals is calculated by a linear similarity, interpolation is carried out as if there were a correlation with the noise occurring in other color signals, so the effect of the noise is felt even in color signals that are not being interpolated, causing interpolation errors.

An object of the present invention is to provide a pixel signal processing apparatus capable of always carrying out interpolation by the optimal interpolation method regardless of how the color component values vary in a neighborhood of the pixel to be interpolated.

Means of Solution of the Problems

This invention provides a pixel signal processing apparatus for generating a pixel signal having a k-th spectral sensitivity characteristic at a pixel position of interest where there is a pixel signal having an h-th spectral sensitivity characteristic in a group of pixel signals from pixels arrayed on a two-dimensional plane, each pixel having one of a first to an N-th spectral sensitivity characteristic, (h and k being different integers between 1 and N, inclusive), the pixel signal processing apparatus comprising:

a first comparison and selection means that, for each of a first plurality of pixels (referred to below as 'first neighboring pixels') having the h-th spectral sensitivity characteristic, disposed in a neighborhood of the pixel position of interest, decides whether the absolute value of the difference between its signal value and the signal value of the pixel signal of the h-th spectral sensitivity characteristic at the pixel position of interest (referred to below as the 'first difference') is larger than a predetermined first threshold value, selects the signal value of the pixel signal of the h-th spectral sensitivity characteristic at the pixel position of interest if the absolute value of the first difference is larger than the first threshold value, and selects the signal value of the first neighboring pixel if the absolute value of the first difference is smaller than the first threshold value; and a first mean value calculating means for calculating a mean value of the plurality of pixel signal values selected by the first comparison and selection means;

an h-signal nonlinear low-pass filter for making the result calculated by said mean value calculating means a low-frequency component of the pixel signal of the h-th spectral sensitivity characteristic at the pixel position of interest;

a second comparison and selection means that, for each of a second plurality of pixels (referred to below as 'second neighboring pixels') having the k-th spectral sensitivity characteristic, disposed in a neighborhood of the pixel position of interest, decides whether the absolute value of the difference between its signal value and the mean value of the signal values of a plurality of pixels of the k-th spectral sensitivity characteristic adjacent to the pixel position of interest (referred to below as the 'second difference') is larger than a predetermined second threshold value, selects said mean value of the signals of said plurality of pixels having the k-th spectral sensitivity characteristic if the absolute value of the second difference is greater than the first threshold value, and selects the signal value of the second neighboring pixel if the absolute value of the second difference is less than the second threshold value;

a second mean value calculating means for calculating a mean value of the signal values of the plurality of pixels selected by the second comparison and selection means;

a k-signal nonlinear low-pass filter for making the result calculated by said mean value calculating means a low-frequency component of the pixel signal with the k-th spectral sensitivity characteristic at the pixel position of interest; and a calculating means for adding a difference between the values obtained by the k-signal nonlinear low-pass filter and the h-signal nonlinear low-pass filter to the value of the h-th pixel signal at the pixel position of interest to obtain the k-th pixel signal at the pixel position of interest.

Effect of the Invention

This invention enables accurate interpolation to be performed despite various different correlations among color component values such as occur when the interpolated pixel is near a color boundary. It also enables pixel interpolation to be performed with good immunity to noise.

BRIEF DESCRIPTION OF THE DRAWINGS

FIG. 2 illustrates a Bayer array of red, green, and blue primary color filters.

FIG. 3 illustrates the red pixel arrangement on the image plane of the image sensor.

FIG. 4 illustrates the green pixel arrangement on the image plane of the image sensor.

FIG. 5 illustrates the blue pixel arrangement on the image plane of the image sensor.

FIG. 6 shows low-pass filtered red signal values.

FIG. 7 shows low-pass filtered green signal values.

FIG. 12 shows the positions of the green signal pixels used in the calculation performed by the unknown color filter in the nonlinear low-pass filter for the green signal.

FIG. 13 shows the positions of the green signal pixels used in the calculation performed by the known color filter in the nonlinear low-pass filter for the green signal.

Figures 14, 15:
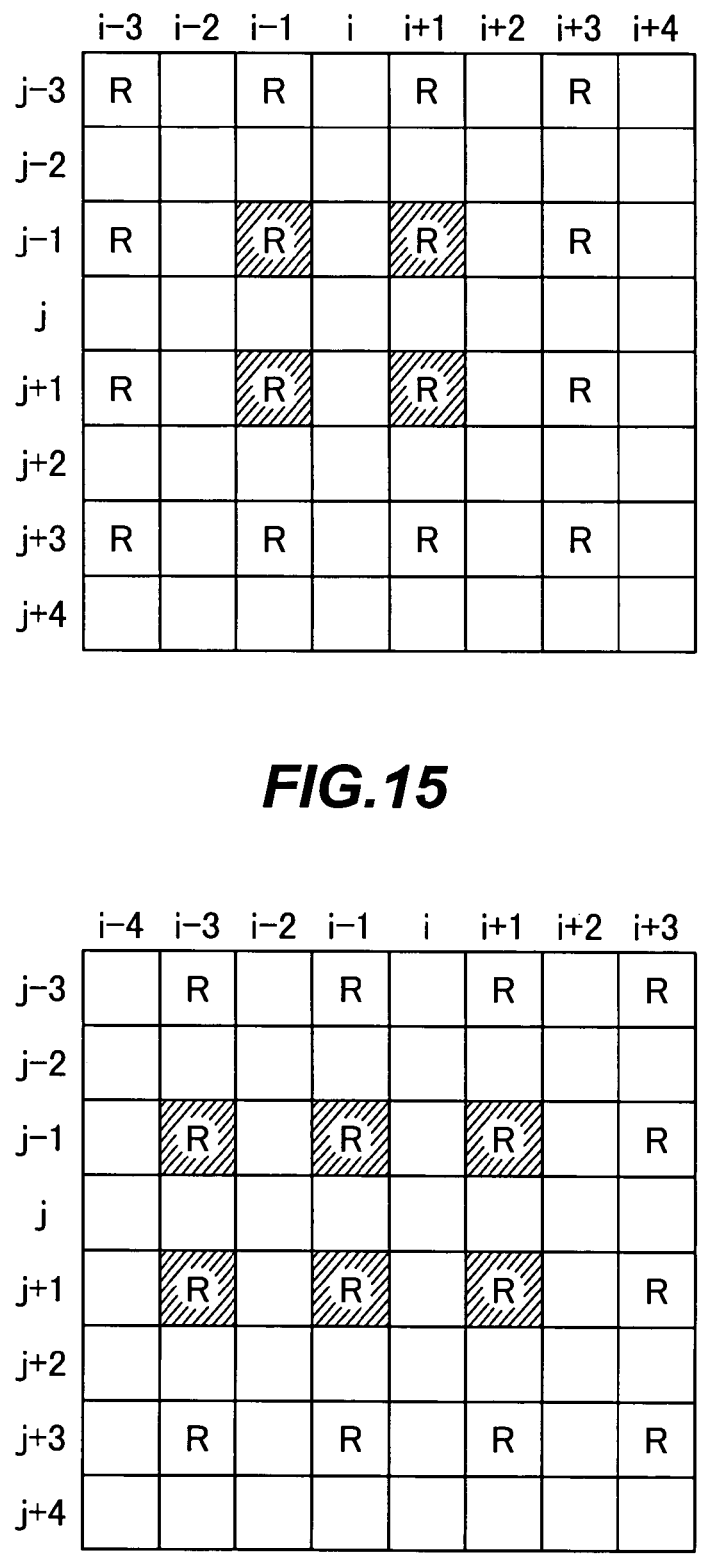

FIG. 14 shows the positions of the red signal pixels used in the calculation performed by the unknown color filter in the nonlinear low-pass filter for the red signal.

FIG. 15 shows the positions of the red signal pixels used in the calculation performed by the known color filter in the nonlinear low-pass filter for the red signal.

FIG. 16 shows the positions of the red signal pixels used in the calculation performed by the unknown color filter in the nonlinear low-pass filter for the red signal.

FIG. 17 shows the positions of the red signal pixels used in the calculation performed by the known color filter in the nonlinear low-pass filter for the red signal.

FIG. 18 shows the positions of the blue signal pixels used in the calculation performed by the unknown color filter in the nonlinear low-pass filter for the blue signal.

FIG. 19 shows the positions of the blue signal pixels used in the calculation performed by the known color filter in the nonlinear low-pass filter for the blue signal.

FIG. 20 shows the positions of the blue signal pixels used in the calculation performed by the unknown color filter in the nonlinear low-pass filter for the blue signal.

FIG. 21 shows the positions of the blue signal pixels used in the calculation performed by the known color filter in the nonlinear low-pass filter for the blue signal.

FIG. 29 shows the arrangement of interpolated green pixel signals at the blue pixel positions.

FIG. 30 shows the arrangement of interpolated red pixel signals at the green pixel positions.

FIG. 31 shows the arrangement of interpolated blue pixel signals at the green pixel positions.

FIG. 32 shows the arrangement of interpolated red pixel signals at the blue pixel positions.

FIG. 33 shows the arrangement of interpolated blue pixel signals at the red pixel positions.

Figure 1:
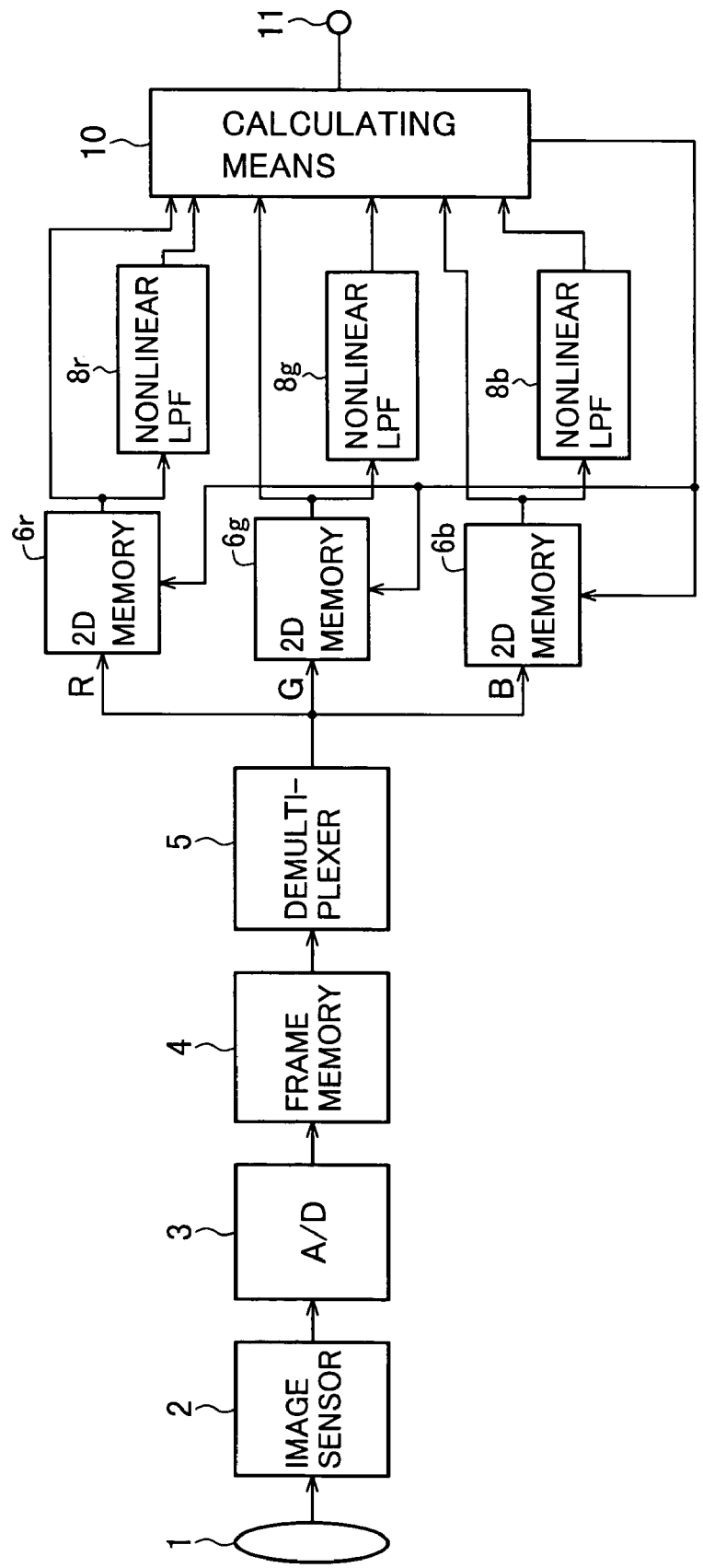
FIG. 1 is a block diagram showing the structure of an imaging apparatus having a pixel signal processing apparatus according to a first embodiment of the invention.

EXPLANATION OF REFERENCE CHARACTERS 1 lens, 2 image sensor, 3 A/D converter, 4 frame memory, 5 demultiplexer, 6r red signal two-dimensional memory, 6g green signal two-dimensional memory, 6b blue signal two-dimensional memory, 8r red signal nonlinear low-pass filter, 8g green signal nonlinear low-pass filter, 8b blue signal nonlinear low-pass filter, 10 calculating means, 11 output terminal, 13 input terminal, 14 output terminal, 15 selection means, 16 selection means, 21 known color filter, 22 input terminal, 23a-23d latches, 24 comparison means, 25 selection means, 26a, 26e three-bit shifters, 26b, 26c, 26d two-bit shifters, 27 adding means, 28 output terminal, 31 unknown color filter, 32 input terminal, 33a-33c latches, 34a-34d comparison means, 35a-35d selection means, 36a adding means, 36b one-bit shifter, 37a adding means, 37b two-bit shifter, 38 output terminal, 41, 42h, 42k selection means, 43 difference calculating means 43, 44 adding means, 45 control means, 46 ratio calculating means, 47 multiplying means.

BEST MODE OF PRACTICING THE INVENTION

Embodiments of this invention will now be described with reference to the attached drawings. The embodiments described below are suitable for use in a digital still camera, but applications of this invention are not limited thereto.

FIRST EMBODIMENT

FIG. 1 is a block diagram showing the structure of an imaging device having pixel signal processing apparatus according to the first embodiment of the invention.

Light incident on a lens 1 is focused on the image plane of, for example, a two-dimensional image sensor 2 comprising solid-state imaging elements. The image sensor 2 has a two-dimensional array of photoelectric conversion devices; the plurality of photoelectric conversion devices are covered by color filters having spectral sensitivity characteristics corresponding, for example, to the red (R), green (G), and blue (B) primary colors, arranged in a Bayer array as shown in FIG. 2; each photoelectric conversion device outputs an analog signal representing a color component corresponding to the color of the color filter.

In FIG. 2, the horizontal axis and vertical axis respectively represent the horizontal direction (H) and vertical direction (V) in the image plane. The photoelectric conversion devices constitute pixels; each position occupied by a photoelectric conversion device corresponds to a pixel position. The pixels are arranged in a two-dimensional array on the image plane, so their positions can be represented by coordinate values in the HV coordinate plane (or HV plane). FIG. 2 shows only a portion of the image sensor, comprising seven rows and seven columns. The pixel at the center is represented by coordinate values (i, j), where i represents horizontal position and j represents vertical position. The neighboring pixels have horizontal (row) positions represented by i−3, i−2, ... , i+3 and vertical (column) positions represented by j−3, j−2, ... , j+3.

In the following discussion, a pixel corresponding to a photoelectric conversion device covered by a red (R) color filter is referred to as a red pixel, a pixel corresponding to a photoelectric conversion device covered by a green (G) color filter is referred to as a green pixel, and a pixel corresponding to a photoelectric conversion device covered by a blue (B) color filter is referred to as a blue pixel.

The image sensor 2 carries out photoelectric conversion of the light incident on each pixel and outputs an analog signal at a level according to the intensity of the incident light. The analog signal is converted to a digital signal and output by an analog-to-digital (A/D) converter 3, and stored in a frame memory 4 as a color component (pixel signal) of the pixel. Each pixel signal is stored in association with its position on the image plane, i.e., a position on the HV coordinate plane.

As mentioned above, since the photoelectric conversion device constituting each pixel is covered by a filter, the device receives red, green, or blue light. The color of the light received by each photoelectric conversion device may be called the 'received color', and other colors may be called 'missing colors'.

Only a signal representing one color component, corresponding to the received color, can be obtained from the photoelectric conversion device that constitutes each pixel. For red pixels, the red component value is known but the green and blue components are unknown; for green pixels, the green component value is known but the blue and red component values are unknown; for blue pixels, the blue component value is known but the red and green component values are unknown. The unknown color component values at each pixel stored in the frame memory 4 may be referred to as missing color component values, because a color image can be reproduced by determining all three component values (red, green, and blue) at every pixel. The image signal processing according to the invention calculates the unknown color component values (missing color component values) at each pixel by interpolation.

The pixel signals stored in the frame memory 4 are demultiplexed by a demultiplexer 5 into red signals, green signals, and blue signals, which are stored separately in the two-dimensional memories 6r, 6g, 6b. Red signals are stored in two-dimensional memory 6r, green signals in two-dimensional memory 6g, and blue signals in two-dimensional memory 6b.

FIGS. 3, 4, and 5 show the arrangements of red pixels, green pixels, and blue pixels on the image plane of the image sensor 2. The signal of each pixel (color component value) is stored in association with its position on the image plane, i.e., the position on the HV coordinate plane, in the two-dimensional memories 6r, 6g, 6b. FIGS. 3, 4 and 5 therefore show the positions on the HV coordinate plane of the pixel signals demultiplexed by the demultiplexer 5 and stored in the memories.

The frame memory 4 is necessary when the image sensor 2 is a so-called interlaced scan sensor that reads out every second line, because this type of sensor must be read twice (two fields) to obtain all the pixel signals in one frame. When the image sensor 2 is a so-called progressive scan sensor that reads the pixels line by line in sequence from the top down in FIG. 2, the frame memory 4 can be omitted because the demultiplexer 5 can demultiplex the signal received directly from the image sensor 2.

Figures 8, 9:
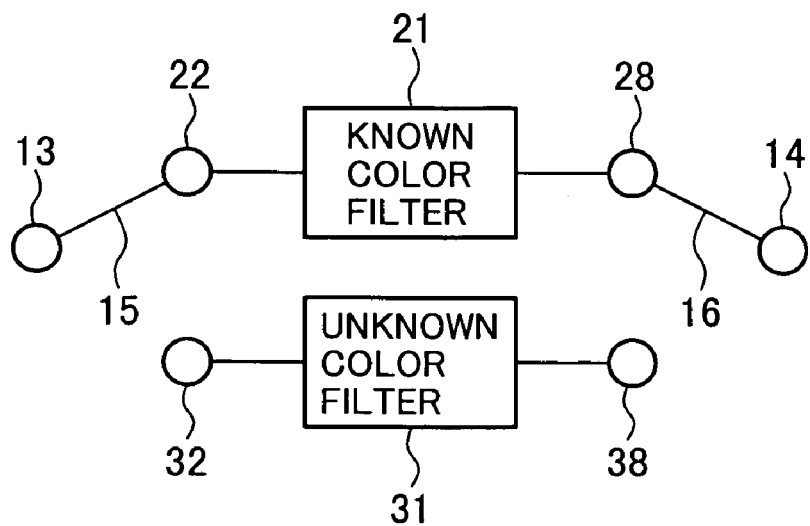
FIG. 8 shows low-pass filtered blue signal values.
FIG. 9 is a block diagram showing an example of the structure of a nonlinear low-pass filter.

Low-pass filters (LPFs) 8r, 8g, 8b are provided for the two-dimensional memories 6r, 6g, 6b to output low-frequency components of the pixel signals of each color read from the two-dimensional memories 6r, 6g, 6b. For each pixel, the low-pass filters 8r, 8g, 8b calculate low-frequency components of the pixel signals of each color in a neighborhood of the pixel, that is, the signals from a plurality of pixels in a range of pixel positions including the position of the pixel in question. The calculation method will be described later. FIGS. 6, 7, and 8 show examples of outputs from the low-pass filters 8r, 8g, 8b.

As can be seen from FIGS. 6, 7, and 8, the outputs from the low-pass filters 8r, 8g, 8b (RNF, GNF, BNF) are calculated for all pixels.

Figure 10:
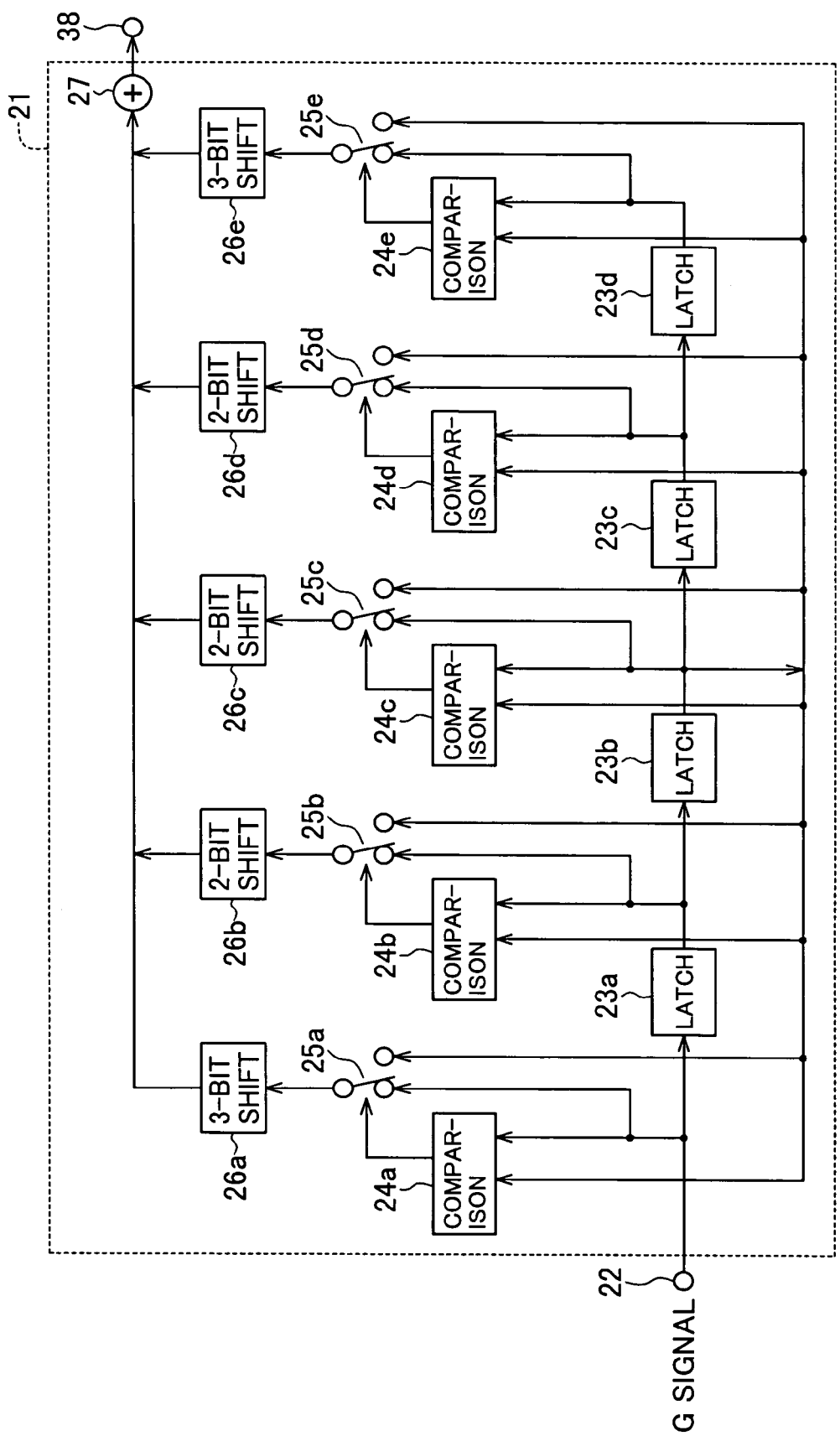
FIG. 10 is a block diagram showing an example of the structure of the known color filter in FIG. 9.
Figure 11:
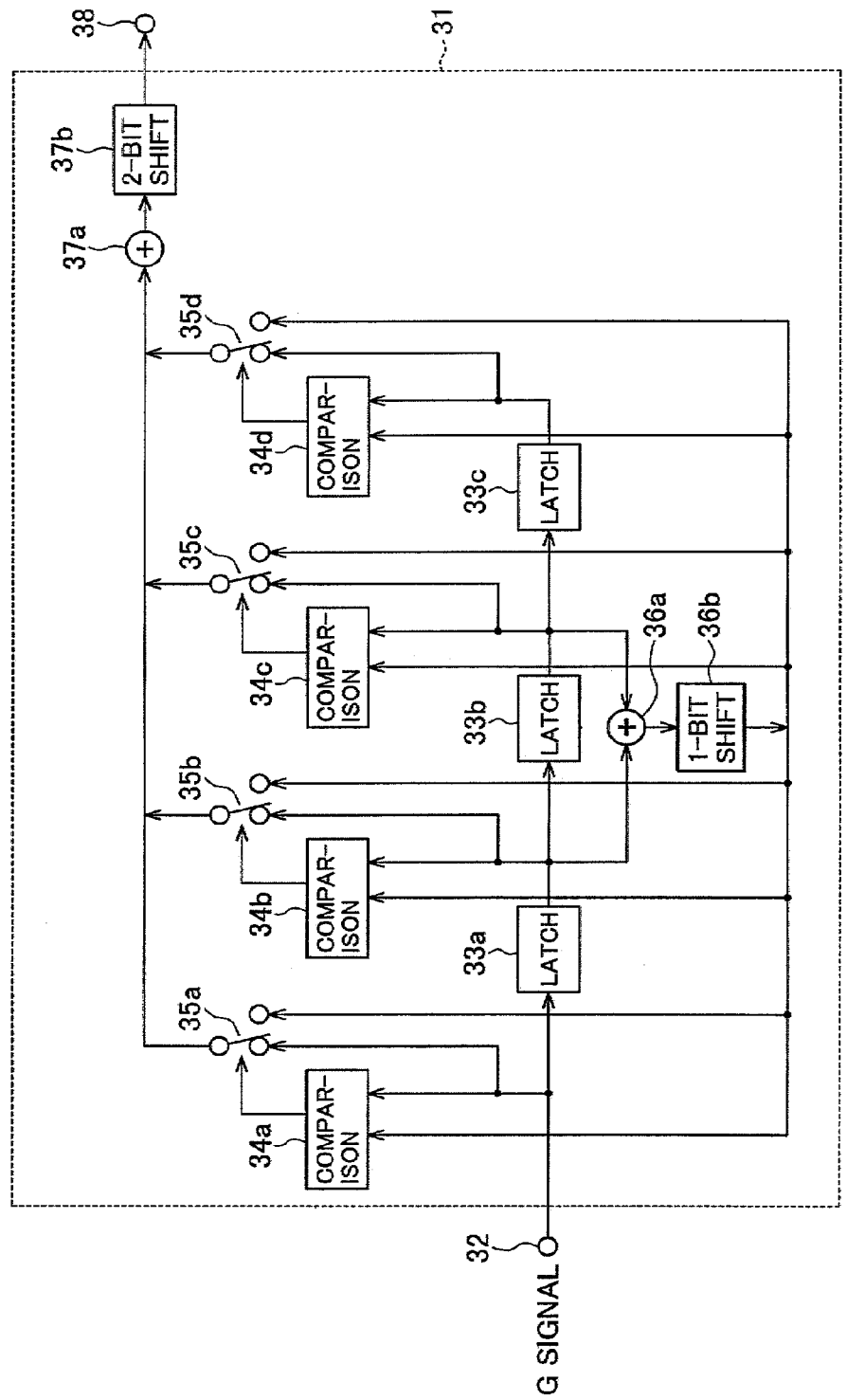
FIG. 11 is a block diagram showing an example of the structure of the unknown color filter in FIG. 9.

FIGS. 9, 10, and 11 show an example of the structure of nonlinear low-pass filter 8g. Only the horizontal line (row) direction of the image sensor 2 is illustrated in the examples in FIGS. 9, 10, and 11, for simplicity. Next, the operation and structure of nonlinear low-pass filter 8g will be described.

FIG. 9 shows the general structure of nonlinear low-pass filter 8g. The nonlinear low-pass filter 8g shown in FIG. 9 comprises an input terminal 13, an output terminal 14, selection means 15 and 16, a known color filter 21, and an unknown color filter 31. Input terminal 13 and output terminal 14 are the input terminal and output terminal, respectively, of the nonlinear low-pass filter 8g.

The known color filter 21 carries out filtering on the green signals in a neighborhood of a pixel position where a green signal is present (for example, (i−1, j) in FIG. 4), and has, for example, the structure shown in FIG. 10.

The unknown color filter 31 carries out nonlinear filtering on the green signals in a neighborhood of a pixel position where a green signal is not present (for example, (i, j) in FIG. 4), and has, for example, the structure shown in FIG. 11.

The selection means 15 and 16 select either the known color filter 21 or the unknown color filter 31, depending on whether the filtering is being carried out at a pixel position where a green signal is present or a pixel position where a green signal is absent, cause the selected filter to carry out nonlinear filtering, and select and output the filtered result. The output from selection means 16 is represented in FIG. 7.

First, the known color filter 21 in FIG. 10 will be described. Green signals are input from an input terminal 22 in the order in which the pixels are read out. Latches 23a to 23d delay the input green color signals by one pixel, and the resultant signals are input to comparison means 24a to 24e, one-by-one. As green signals are present at every second pixel, consecutive pixel signals will be spaced apart by a distance corresponding to two pixels on the HV plane (with one pixel in between). For example, if $G(i-5, j)$ is the green signal output from latch 23*d* to comparison means 24*e*, then the green signal output from latch 23*c* to comparison means 24*d* is $G(i-3, j)$, the green signal output from latch 23*b* to comparison means 24*c* is $G(i-1, j)$, the green signal output from latch 23*a* to comparison means 24*b* is $G(i+1, j)$, and the green signal output from the input terminal 22 to comparison means 24*a* is $G(i+3, j)$. The signals output from the latches 23*a* to 23*d* and the input terminal 22 to the comparison means 24*a* to 24*d* are simultaneously output to selection means 25*a* to 25*e*. The signal $G(i-1, j)$ is output to all of the selection means 25*a* to 25*e*.

The comparison means 24*a* to 24*e* compare the green signals input from the latches 23*a* to 23*d* and the input terminal 22 with the sum of $G(i-1, j)$ and a predetermined constant s (first threshold), and with the difference between the $G(i-1, j)$ and the predetermined constant s. The comparison means 24*a* to 24*e* output their comparison results to the selection means 25*a* to 25*e*.

The selection means 25*a* to 25*e* select signals according to the results of the comparisons made in the comparison means 24*a* to 24*e*. The comparison means 24*a* to 24*e* compare their input green signals with the sum $G(i-1, j)+s$ of $G(i-1, j)$ and a predetermined constant s, and the difference $G(i-1, j)-s$ between $G(i-1, j)$ and the predetermined constant s. The comparison means 24*a* to 24*e* output the comparison results.

The selection means 25*a* to 25*e* select the green signal when the green signal input to the comparison means 24*a* to 24*e* is smaller than $G(i-1, j)+s$ but larger than $G(i-1, j)-s$, and select $G(i-1, j)$ when the input green signal is larger than $G(i-1, j)+s$ or smaller than $G(i-1, j)-s$. In other words, when the absolute value of the difference between the green signal at the relevant position and $G(i-1, j)$ is smaller than a threshold s, the green signal is selected, but when the absolute value of the difference is larger than the threshold s, $G(i-1, j)$ is selected.

The green signal at selection means 25*c* is $G(i-1, j)$, so the necessary condition (that the absolute value of the difference between the green signal and $G(i-1, j)$ not be larger than the threshold s) is always satisfied, and the green signal is selected and output every time. Therefore, comparison means 24*c* and selection means 25*c* can be omitted and the output from the latch 23*b* can be input directly to the two-bit shifter 26*c*.

The comparison means 24*a* to 24*e* and selection means 25*a* to 25*e* constitute a first comparison and selection means that, for each of a first plurality of pixels (referred to below as 'first neighboring pixels') having the h-th spectral sensitivity characteristic, disposed in a neighborhood of the pixel position of interest (i, j), decides whether the absolute value of the difference between its signal value (signal value of the first neighboring pixel) and the signal value (h(i, j)) of the pixel signal of the h-th spectral sensitivity characteristic at the pixel position of interest (referred to below as the 'first difference') is larger than a predetermined first threshold value (s), selects the signal value of the pixel signal of the h-th spectral sensitivity characteristic at the pixel position of interest if the absolute value of the first difference is larger than the first threshold value, and selects the signal value of the first neighboring pixel if the absolute value of the first difference is smaller than the first threshold value.

The signal selected by selection means 25*a* undergoes a three-bit shift toward the less significant direction in a three-bit shifter 26*a*, which reduces the signal level to ⅛ of its original level. The signals selected by selection means 25*b*, 25*c*, 25*d* undergo a two-bit shift toward the less significant direction in two-bit shifters 26*b*, 26*c*, 26*d*, which reduces their signal levels to ¼ of the original level. The signal selected by selection means 25*e* undergoes a three-bit shift toward the less significant direction in three-bit shifter 26*e*, which reduces its signal level to ⅛ of its original level. The bit-shifted signals are summed in the adding means 27.

The above calculation performs a nonlinear low-pass filtering operation in which signal values at pixels where the signal varies greatly are not used. This contrasts with conventional linear low-pass filtering in which a weighted mean of five horizontally aligned pixels is calculated.

Next, the unknown color filter 31 in FIG. 11 will be described. Green signals are input from an input terminal 32 in the order in which the pixels are read out. Latches 33*a* to 33*c* delay the input green signals by one pixel, and the resultant signals are input to comparison means 34*a* to 34*d*, one-by-one. For example, if the green signal output from latch 33*c* to comparison means 34*d* is the green signal $G(i-3, j)$ at pixel position (i-3, j), then the green signal output from latch 33*b* to comparison means 34*c* is $G(i-1, j)$, the green signal output from latch 33*a* to comparison means 34*b* is $G(i+1, j)$, and the green signal output from the input terminal 32 to comparison means 34*a* is $G(i+3, j)$. (The notation $G(x, y)$ indicates the color signal name (G) and pixel position (x, y). This notation will be applied to other color signals below.) The green signals output from the latches 33*a* to 33*c* and the input terminal 32 to the comparison means 34*a* to 34*d* are simultaneously output to selection means 35*a* to 35*d*.

$G(i-1, j)$ and $G(i+1, j)$ are also input to an adding means 36*a*. After the adding means 36*a* adds these signals, a one-bit shifter 36*b* shifts the sum by one bit toward the less significant direction, thereby obtaining their mean value $\{G(i-1, j)+G(i+1, j)\}/2$. The mean value is output to selection means 35*a* to 35*d*.

The comparison means 34*a* to 34*d* compare the green signals input from the latches 33*a* to 33*c* and the input terminal 32 with the sum $\{G(i-1, j)+G(i+1, j)\}/2+s$ of the signal $\{G(i-1, j)+G(i+1, j)\}/2$ output from the one-bit shifter 36*b* and a predetermined constant s (second threshold; in this embodiment, the first threshold and the second threshold have the same value (s), but different first and second thresholds may be used), and compare the green signals with the difference $\{G(i-1, j)+G(i+1, j)\}/2-s$ between the sum $\{G(i-1, j)+G(i+1, j)\}/2$ and the constant s. The comparison results are output to the selection means 35*a* to 35*d*.

The selection means 35*a* to 35*d* select signals according to the results of the comparisons made in the comparison means 34*a* to 34*d*. The comparison means 34*a* to 34*d* compare their input green signals with $\{G(i-1, j)+G(i+1, j)\}/2+s$, and with $\{G(i-1, j)+G(i+1, j)\}/2-s$, to determine if the green signal is larger than $\{G(i-1, j)+G(i+1, j)\}/2+s$, or smaller than $\{G(i-1, j)+G(i+1, j)\}2-s$, and output the comparison results. The selection means 35*a* to 35*d* select the green signal if the green signal input to the comparison means 34*a* to 34*d* is smaller than $\{G(i-1, j)+G(i+1, j)\}/2+s$ but larger than $\{G(i-1, j)+G(i+1, j)\}/2-s$. The selection means 35*a* to 35*d* select $\{G(i-1, j)+G(i+1, j)\}/2$ when the green signal is larger than $\{G(i-1,)+G(i+1, j)\}/2+s$ or smaller than $\{G(i-1, j)+G(i+1, j)\}/2-s$. In other words, the input green signal is selected when the absolute value of the difference between the green signal at the relevant pixel position in the low-pass filtering calculation and $\{G(i-1, j)+G(i+1, j)\}/2$ is smaller than the predetermined threshold s, while $\{G(i-1,j)+G(i+1, j)\}/2$ is selected when the absolute value is larger than the predetermined threshold s. This operation excludes pixel values having large variations from for the low-pass filtering calculation.

The comparison means 34*a* to 34*d* and the selection means 35*a* to 35*d* constitute a second comparison and selection means that, for each of a second plurality of pixels (referred to below as 'second neighboring pixels') having the k-th spectral sensitivity characteristic, disposed in a neighborhood of the pixel position of interest (i, j), decides whether the absolute value of the difference between its signal value (signal value of the second neighboring pixel) and the mean value of the signal values of a plurality of pixels of the k-th spectral sensitivity characteristic adjacent to the pixel position of interest (i, j) (referred to below as the 'second difference') is larger than a predetermined second threshold value (s), selects said mean value of the signals of said plurality of pixels having the k-th spectral sensitivity characteristic if the absolute value of the second difference is greater than the second threshold value, and selects the signal value of the second neighboring pixel if the absolute value of the second difference is less than the second threshold value.

Although the first threshold and the second threshold have the same value (s) in this embodiment, these thresholds may have values that differ from each other.

The four signals selected by the selection means 35a to 35c are added by the adding means 37a and undergo a two-bit shift in a two-bit shifter 37b, whereby the mean value of the four pixels (simple mean) is obtained. In this structure, the two-bit shifter 37b is disposed behind the adding means 37a, however, the same calculation can be carried out in a different configuration in which a two-bit shifter 37b is disposed behind respective selection means 35a to 35d, in order to reduce the number of bits operated on by adding means 37a.

The above calculation performs a nonlinear low-pass filtering operation in which signal values at pixels where the signal varies greatly are not used. This contrasts with conventional linear low-pass filtering in which the mean value (either simple mean or weighted mean) of four horizontally aligned pixels is calculated.

In the nonlinear low-pass filter 8g described above, when a green signal is not present at the pixel position being filtered (for example, (i, j)), selection means 29 inputs the green signals to the unknown color filter 31 shown in FIG. 11, but when a green signal is present at the pixel position (for example, at (i−1, j)), the selection means 29 inputs the green signals to the known color filter 21 shown in FIG. 10. The selection means 16 outputs signals from either the unknown color filter 31 or known color filter 21, as appropriate. As a result, a nonlinear filtered output (GNF) is obtained from output terminal 14 as shown in FIG. 7.

Nonlinear low-pass filters 8r and 8b have the same structure as nonlinear low-pass filter 8g.

In the above description, the one-dimensional case has been described for simplicity. However, nonlinear filtering may be carried out two-dimensionally by using a plurality of line memories and circuits similar to those shown in FIGS. 9, 10, and 11 and providing comparison means and mean-value calculating means (for either a simple mean or a weighted mean).

FIGS. 12 to 21 show examples of the pixel positions in the two-dimensional plane used in the calculations for nonlinear filtering of the color signals. FIGS. 12 and 13 illustrate the green signal; FIG. 12 shows a case in which the green signal is not present at the target position (i, j) of the calculation. The green signals used in the calculation are represented by shadowed rectangles. When the mean is calculated, the green signal at position (i, j) is compared with {G(i−1, j)+G(i+1, j)+G(i, j−1)+G(i, j+1)}/4. If the absolute value of the difference is larger than a predetermined threshold s, {G(i−1, j)+G(i+1, j)+G(i, j−1)+G(i, j+1)}/4 is used for the calculation instead of the green signal. Alternatively, in the calculation of the mean, a weighted mean can be calculated by weighting the signals according to their distance from the target position (i, j). The greater the distance is, the smaller the weighting coefficient should be.

When a green signal is present at the target position (i−1, j) as shown in FIG. 13, a weighted mean of the green signals at the shadowed pixel positions is calculated, using weights based on the distance from (i−1, j). When the weighted mean is calculated, however, each green signal that enters the calculation is compared with G(i−1, j), and if the absolute value of the difference is larger than a predetermined threshold s, G(i−1, j) is used instead of the green signal. For the green signal, nonlinear low-pass filtered outputs can be calculated at all pixel positions using the weighted means illustrated in FIGS. 12 and 13.

Pixels with red signals and blue signals are disposed in every second line. For red signal, the calculation is carried out as shown in FIGS. 14 to 17. Similar to the case of the green signal, red signals which differ significantly from the signal at the target position of the calculation are excluded from the weighted mean. The calculations for a blue signal, illustrated in FIGS. 18 to 21, are similar to the calculations for a red signal.

The weights and signals used in the nonlinear low-pass filtering processes described above are shown only for illustrative purpose. The general form is represented by the following equation (1).

$$CNF(i, j) = C(i, j) + \sum_{p=-N}^{N} \sum_{q=-N}^{N} a_{i,j} F[C(i-p, j-q) - C(i, j)] \tag{1}$$

In equation (1), C is a color signal: either the red, green, or blue signal. CNF(i, j) is the nonlinear low-pass filtered output signal at position (i, j), and C(i, j) is the input signal. −N and N are constants representing the number of positions where pixel signals are sampled. The coefficients $a_{i,j}$ are filter coefficients predetermined so as to avoid changing the overall signal level for either a weighted mean calculation or simple addition. In the example shown in FIG. 11 above, the value of these coefficients is ¼; in the example shown in FIG. 10, values of ⅛ and ¼ are used. F[•] is a nonlinear function in which the absolute value of the function value is limited to |F[•]|<s, where s is a predetermined threshold as above. This filter can carry out signal smoothing while keeping the difference between the input and the output within a finite value range; thus, it can preserve sudden signal changes and at the same time eliminate random small-signal noise.

Next, the calculating means 10 will be described.

Based on the pixel signals read from the two-dimensional memories 6r, 6g, 6b and the outputs from the nonlinear low-pass filters 8r, 8g, 8b, the calculating means 10 calculates the interpolated value of each pixel.

Figure 22:
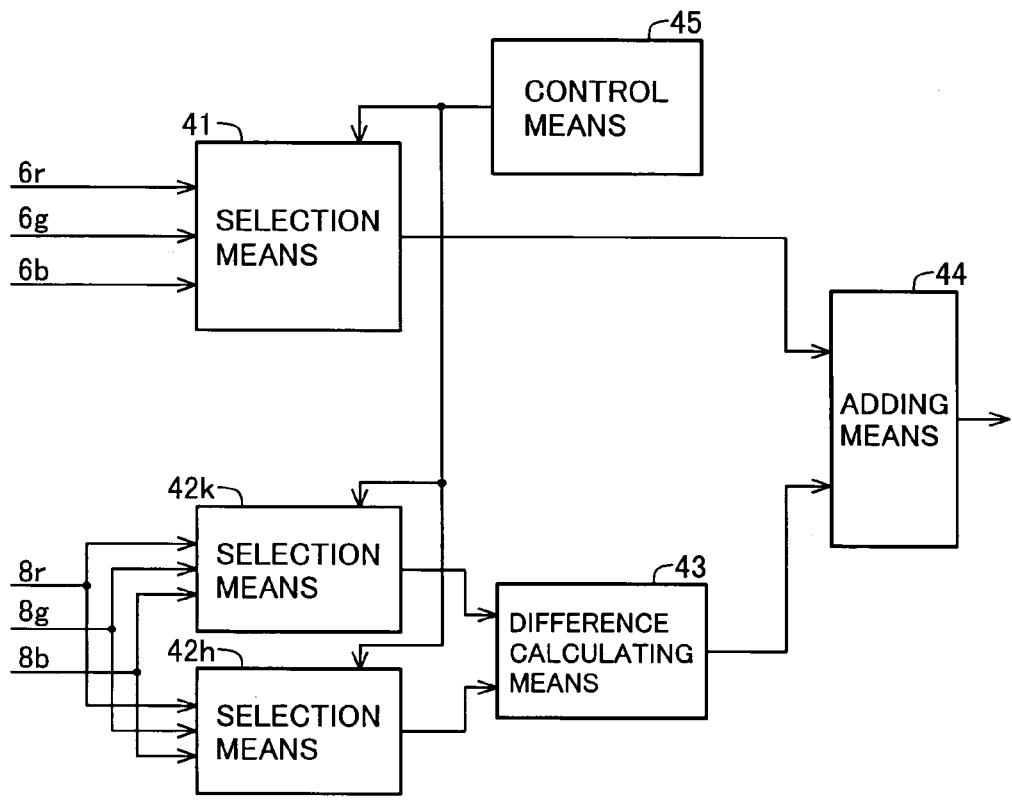
FIG. 22 is a block diagram showing the structure of the calculating means in the first embodiment.

The calculating means 10 has, for example, selection means 41, 42k, 42h, a difference calculating means 43, an adding means 44, and a control means 45, as shown in FIG. 22.

Selection means 41 selects one of the two-dimensional memories 6r, 6g, 6b and supplies pixel signals read from the selected two-dimensional memory 6r, 6g, or 6b to the adding means 44.

Selection means 42k receives the outputs RNF, GNF, BNF from the low-pass filters 8r, 8g, 8b, and selects and outputs one of them. Selection means 42h also receives the outputs RNF, GNF, BNF from the low-pass filters 8r, 8g, 8b, and selects and outputs one of them.

The selections made by the selection means 41, 42k, 42h are controlled by a control means 30.

When a pixel has the color component value of the h-th color (red, green, or blue) and its k-th color component value is calculated by interpolation, selection means 41 selects the two-dimensional memory storing the color component values of the h-th color and reads the color component value of the h-th color at the pixel to be interpolated (e.g., h(i, j)); selection means 42k selects the output kNF of the low-pass filter of the k-th color; and selection means 42h selects the output hNF of the low-pass filter of the h-th color.

Difference calculating means 43 calculates the difference (kNF−hNF) between the k-th nonlinear low-pass filtered signal kNF selected by selection means 42k and the h-th nonlinear low-pass filtered signal hNF selected by selection means 42h by subtracting the latter from the former.

The adding means 44 adds the pixel value h output from selection means 41 and the value (kNF−hNF) output from difference calculating means 43 and outputs their sum h+r (kNF−hNF).

The output of the adding means 44 is used as the color component value (interpolated value) of the k-th color of the pixel being interpolated.

The nonlinear low-pass filters 8r, 8g, 8b, and selection means 42k, 42h constitute a low-frequency component generation means that generates the low-frequency component of the pixel signal with the k-th spectral sensitivity characteristic at the plurality of pixel positions in the neighborhood of the pixel to be interpolated, and the low-frequency component of the pixel signal with the h-th spectral sensitivity characteristic at the plurality of pixel positions in the neighborhood of the pixel to be interpolated.

Selection means 41, the difference calculating means 43, and the adding means 44 constitute an interpolated value calculating means that calculates a pixel signal (interpolated value) of the k-th color at the pixel position to be interpolated, based on the pixel signal of the h-th color at the pixel position to be interpolated and the difference (kNF−hNF) between the nonlinear low-pass filter outputs. More particularly, the interpolated value calculating means adds the pixel signal h of one color (the h-th color) at the pixel position to be interpolated and the difference (kNF−hNF) calculated by difference calculating means 43 to calculate a pixel signal of another color (the k-th color) at the pixel position to be interpolated.

The interpolated value calculated by the interpolated value calculating means is stored in a two-dimensional memory (two-dimensional memory 6r, 6g, or 6b) for the pixel signal of the k-th color, for example. Alternatively, the value is output from an output terminal 11.

Next, the above interpolation method will be described in detail.

In the image sensor 2, red, green, and blue filters are disposed at corresponding pixel positions in a Bayer array as shown in FIG. 2, for example. As a pixel signal of only one color is obtained from each pixel position, color signals missing at the pixel position must be generated to obtain red, green, and blue signals at each pixel. This procedure is commonly referred to as pixel interpolation. Red, green, and blue signals are obtained through interpolation by the calculating means 10 at each pixel position and output from the output terminal 11. Next, the method used to generate missing color signals according to the invention will be described.

FIG. 4 shows the arrangement of green signals on the HV coordinate plane.

The green signals shown in the figure are obtained through green filters disposed on the image sensor 2. The blanks show positions where green signals are missing because the positions are covered by a filter of another color, i.e., a red or blue filter. Green signals must be interpolated at these positions.

Conventional interpolation methods include mean interpolation (bilinear interpolation), which uses a mean value of neighboring pixels. Unfortunately, this method lacks accuracy in areas of significant signal variation.

Therefore, in local areas in an image, interpolation accuracy can be improved by using the correlation between variations in the red, green, and blue signals. In areas with varying degree of correlation, interpolation accuracy can be improved by correctly calculating the degree of correlation.

This embodiment provides a method that can carry out accurate interpolation even in areas lacking similarity in the variation in color components of pixels neighboring the pixel to be interpolated, and can carry out optimal interpolation regardless of how the color component values vary. The interpolation calculation carried out by the calculating means 10 can be expressed by the following equation (2).

$$k(i,j)=h(i,j)+(kNF(i,j)-hNF(i,j)) \quad (2)$$

In equation (2), k(i, j) represents a missing color signal at position (i, j) on the image sensor 2, that is, a color signal to be interpolated, while h(i, j) represents a color signal already present at that position, that is, a signal having a known value. kNF and hNF are nonlinear low-pass filter output values calculated by a predetermined computation from the k and h signals at pixel position (i, j) and its neighboring pixel positions. The nonlinear low-pass filter output values are obtained from the nonlinear low-pass filters 8r, 8g, 8b shown in FIG. 1.

The meaning of the calculation expressed in the above equation (1) will be described with reference to FIGS. 23, 24, 25, and 26, which show the color signal levels and positions of pixels on the image sensor 2. For simplicity, only one row of the image sensor 2 and only one-dimensional calculations are illustrated. The band at the top shows the arrangement of color filters, where h represents an h pixel, k represents a k pixel, and the expressions in parentheses are coordinates indicating the pixel position. The black dots on curves a and b represent pixel signal values of the k and h signals obtained from the image sensor 2. Curves c and d represent low-pass filtered values of the k and h signals, while curves e and f represent high-pass filtered values of the k and h signals. A method of pixel interpolation of the k signal at pixel position (i, j) will be described with reference to these drawings.

Figure 23:
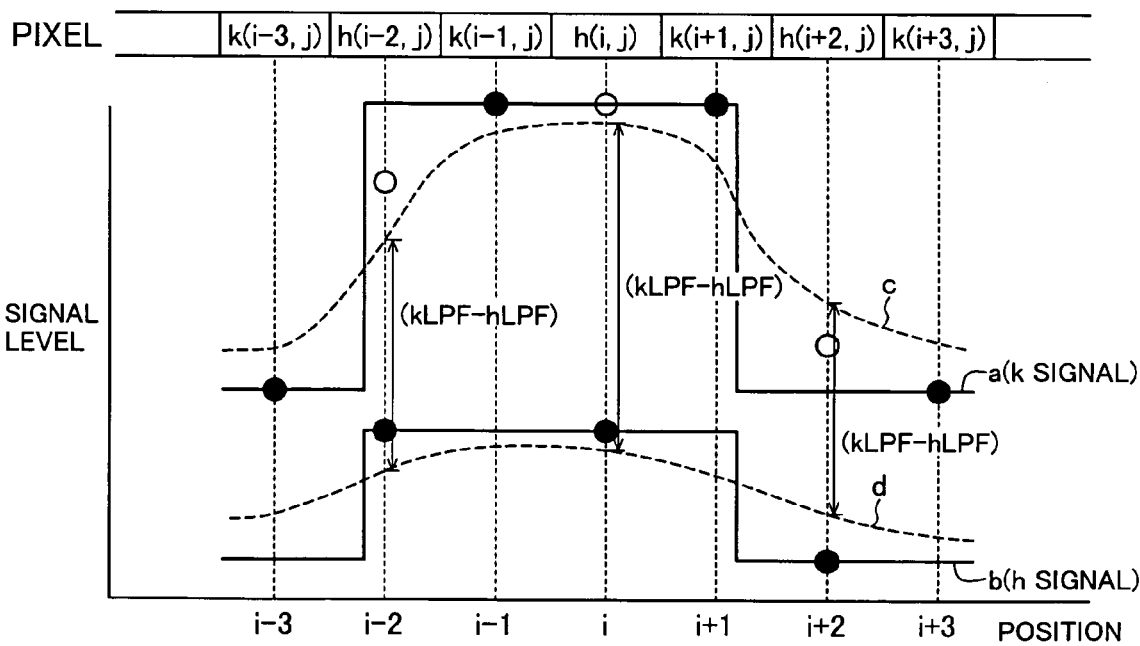
FIG. 23 schematically illustrates the principle of pixel interpolation in the prior art for a case of low correlation between the k and h signals.
Figure 24:
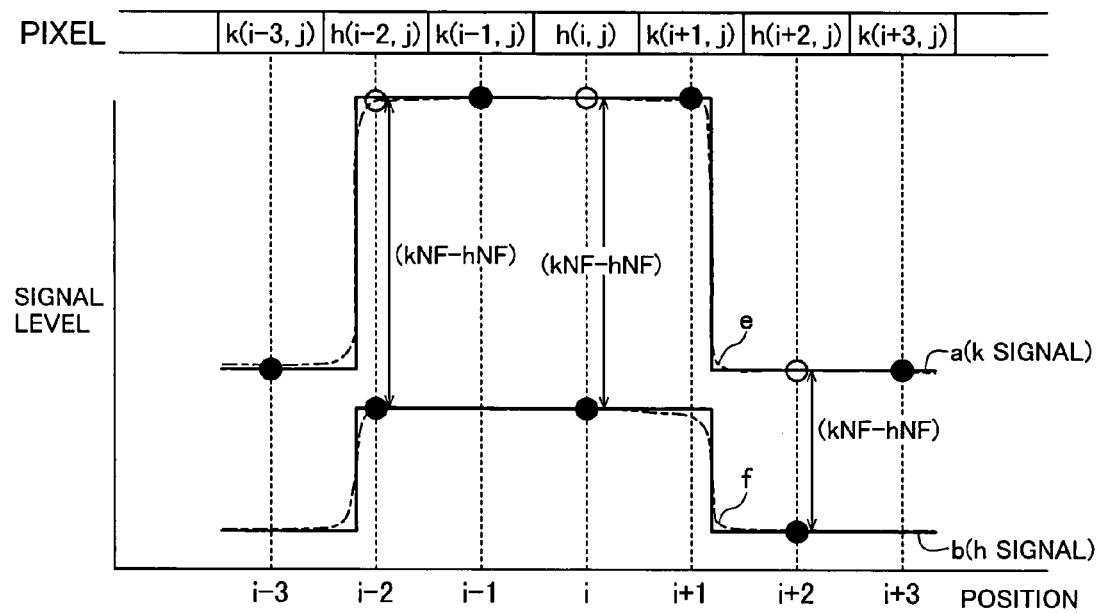
FIG. 24 schematically illustrates the principle of pixel interpolation in the first embodiment for a case of low correlation between the k and h signals.
Figure 25:
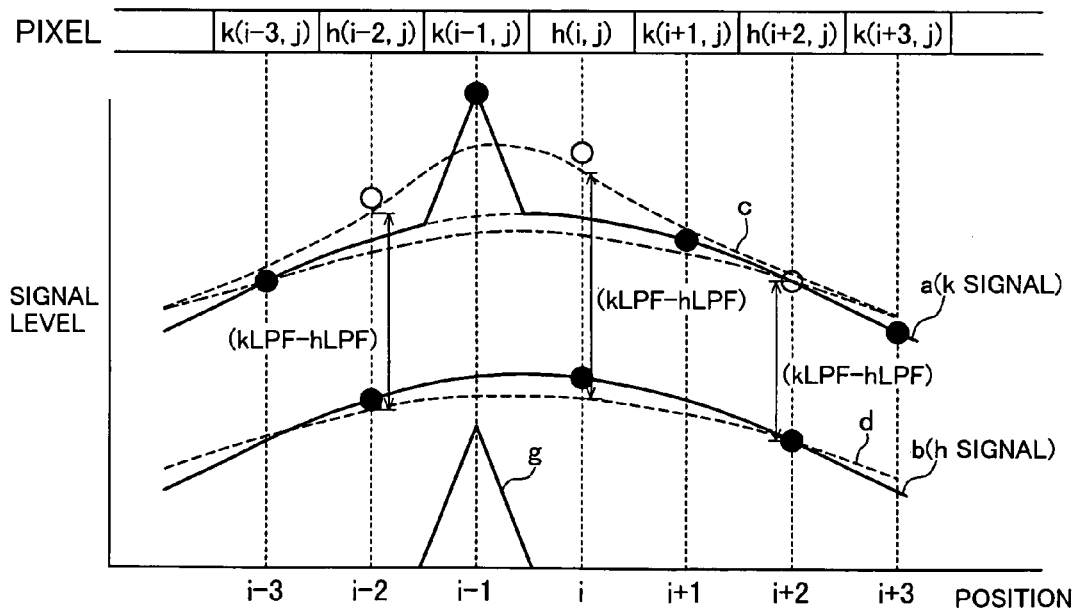
FIG. 25 schematically illustrates the principle of pixel interpolation in the prior art for a case of low correlation between the k and h signals.
Figure 26:
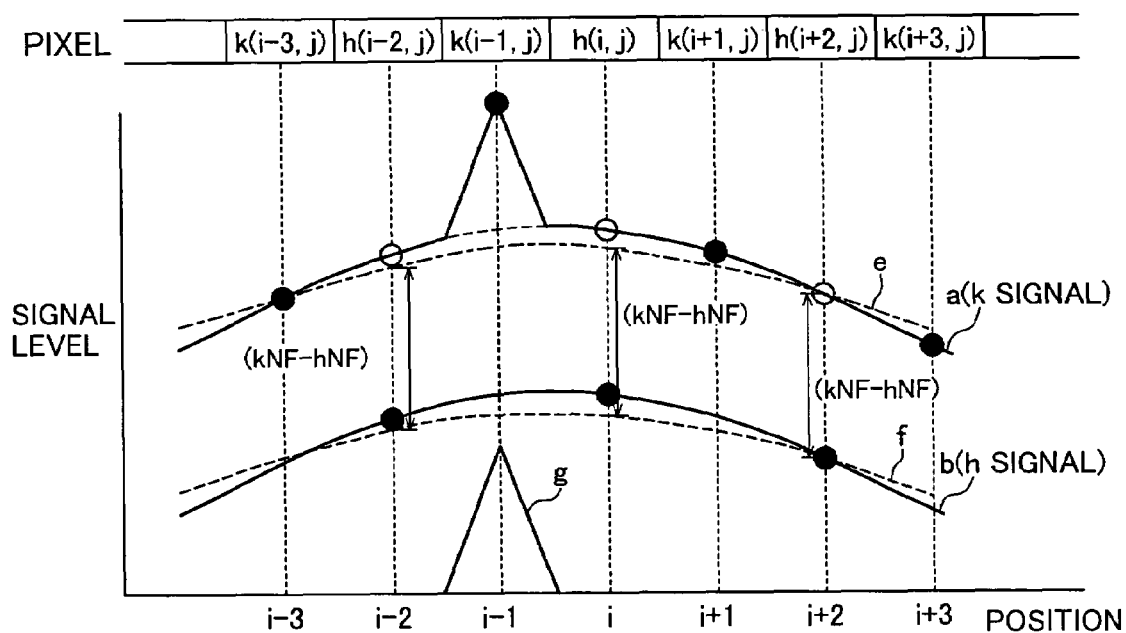
FIG. 26 schematically illustrates the principle of pixel interpolation in the first embodiment for a case of low correlation between the k and h signals.

FIGS. 23 and 24 show cases in which the k and h signals vary according to convex curves having different profiles; FIGS. 25 and 26 shows cases in which the pixel signals are contaminated by noise. FIGS. 23 and 25 show results of conventional interpolation, while FIGS. 24 and 26 show results of interpolation by the method according to this embodiment.

FIG. 23 illustrates a conventional interpolation method that uses correlation. In the conventional method, as correlation is used for interpolation of the k signal at position h(i, j), a linear low-pass filter (simple mean or weighted mean) is used to calculate variation in the signal. That is, in order to calculate k(i, j), (kLPF(i, j)−hLPF(i, j)) is added to the h(i, j) signal at the same position. kLPF(i, j) is the linear low-pass filtered output value of the k signal at position (i, j); hLPF(i, j) is the linear low-pass filtered output value of the h signal at position (i, j). In the above pixel interpolation method, accurate pixel interpolation can be carried out when there is significant positive correlation between color signals, but interpolation error may occur when there is insufficient correlation.

The k and h signals in FIG. 23 follow convex curves having different profiles. Color signals at an edge in an image or at places showing significant color change in an image may often have this type of signal waveform. In this case, the degree of correlation between the two signals is low. Curve c in FIG. 23 represents the output of linear low-pass filter kLPF, while curve d represents the output of linear low-pass filter hLPF. As there is only low correlation between signals, the signal waveforms of kLPF and hLPF have different shapes and lack similarity. Therefore, as represented by white circles, interpolation error may occur in the k signal interpolated according to the conventional method at edges of signal variation such as at position h(i−2, j) or h(i+2, j).

The pixel interpolation method according to this embodiment uses values from nonlinear low-pass filter 8r, nonlinear low-pass filter 8g, and nonlinear low-pass filter 8b for pixel interpolation. FIG. 24 shows an example. In the nonlinear low-pass filters shown in FIGS. 10 and 11, when there are major signal variations, the signal at the position for which a low-pass filtered value is being calculated substituted for the greatly varying signal values. Therefore, as shown by curves e and f in the FIG. 24, the output waveform tracks the abrupt signal variations. In these figures, curve e is the nonlinear low-pass filtered output kNF of the k signal, while curve f is the nonlinear low-pass filtered output hNF of the h signal. The pixel values calculated according to the equation (2) are represented by the white circles in FIG. 24, which demonstrate accurate interpolation having values substantially identical to the true values. As described, by calculating correlations between color signals from the output values of the nonlinear low-pass filters, highly accurate interpolation can be carried out.

Next, another example will be described. FIGS. 25 and 26 show examples of pixel interpolation for a case in which the signals are contaminated with noise. FIG. 25 shows an example of pixel interpolation by the conventional method. Noise is assumed to have occurred at pixel position (i−1, j). This noise is added to the k signal, so the k signal has noise at position (i−1, j). The linear low-pass filtered value kLPF of the k signal is represented by curve c in FIG. 25, which is a signal waveform containing signal variation due to noise. Curve d is the low-pass filtered output hLPF of the h signal. Interpolated pixel values of the k signal are represented by white circles. As kLPF suffers from noise, the interpolated pixel values at positions (i−2, j) and (i, j) differ from the true values, showing aggravated error introduced by noise. When the output of a linear low-pass filter is used, accordingly, there is the problem that noise added to a signal may affect pixel interpolation.

FIG. 26 shows an example of pixel interpolation according to this embodiment. In this figure, curve e represents the nonlinear low-pass filtered value kNF of the k signal, while curve f represents the nonlinear low-pass filtered value hNF. As in FIG. 25, noise is added to the k signal at pixel position (i−1, j). In the nonlinear low-pass filters shown in FIGS. 10 and 11, as filtering is carried out using the signal at the target position of the filtering calculation instead of greatly differing signal values, a low-frequency signal component which is free from large signal variations (noise) in small domains is obtained, as shown by the k signal in FIG. 26. As indicated by the white circles in FIG. 26, highly accurate interpolation can be carried out even when noise is added to the signal.

Pixel interpolations will now be described more specifically. The procedure followed by the calculating means 10 is shown in the flowchart in FIG. 27. As shown in the flowchart the interpolated value is calculated in the following six steps.
Step 1: Calculate green signal (GonR) at red pixel position.
Step 2: Calculate green signal (GonB) at blue pixel position.
Step 3: Calculate red signal (RonG) at green pixel position.
Step 4: Calculate blue signal (BonG) at green pixel position.
Step 5: Calculate blue signal (BonR) at red pixel position.
Step 6: Calculate red signal (RonB) at blue pixel position.

These steps can be generalized as:
Calculate k signal (k=R, G, or B) at h pixel position (h=R, G, or B, h≠k)

Each of these six steps is carried out at every pixel position on the screen (in one frame).

When all six processing steps above have been completed, pixel signals are present for the missing colors at all pixel positions on the screen.

First, the calculation in step S1 will be described. The nonlinear low-pass filter output (also referred to below as the 'NF output', NF meaning nonlinear low-pass filter) of the green signal is calculated by nonlinear low-pass filter 8g in FIG. 1, and the calculated result is input to the calculating means 10.

Similarly, the NF output of the red signal is calculated by nonlinear low-pass filter 8r in FIG. 1, and the calculated result is input to the calculating means 10.

The green signal at a red pixel position is calculated from the following equation (3), which conforms to equation (2). The coordinate values in equation (3) differ from equation (2) because red pixels are present at positions (i+n, j+m), where m and n are odd integers.

$$G(i+n, j+m) = \quad (3)$$
$$R(i+n, j+m) + (GNF(i+n, j+m) - RNF(i+n, j+m))$$

Figures 27, 28:
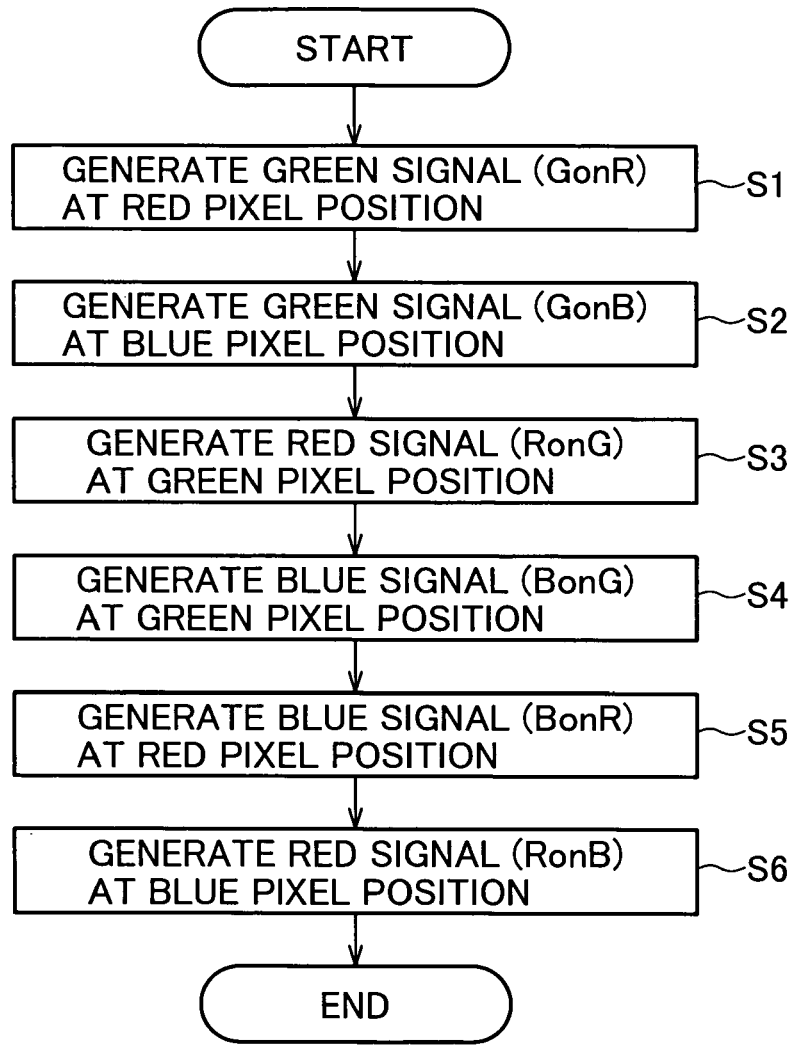
FIG. 27 is a flowchart of an interpolation procedure in the first and a second embodiment of the invention.
FIG. 28 shows the arrangement of interpolated green pixel signals at the red pixel positions.

FIG. 28 shows the two-dimensional positions of the green signals gr obtained at red pixel positions by interpolation according to equation (3).

Next comes the calculation process in step S2. In step S2, green signals missing at blue pixel positions are interpolated. The NF output of the blue signal is calculated by nonlinear low-pass filter 8b in FIG. 1, and the calculated result is input to the calculating means 10. The green signal at a blue pixel position is calculated from the following equation (4), which conforms to equation (2). The coordinate values differ from equation (2) because blue pixels are present at positions (i+u, j+v), where u and v are even integers.

$$G(i+u, j+v) = \quad (4)$$
$$\{B(i+u, j+v) + (GNF(i+u, j+v) - BNF(i+u, j+v))$$

FIG. 29 shows the two-dimensional positions of the green signals gb obtained at blue pixel positions by interpolation according to equation (4). FIG. 29 also shows the interpolated signals gr obtained from equation (3). Green signals are obtained for all the pixel positions by interpolation of the green signals at red pixel positions according to equation (3) and at blue pixel positions according to equation (4).

Next comes the calculation process in step S3. In step S3, red signals missing at green pixel positions are interpolated. The red signal at a green pixel position is calculated from the following equations (5) and (6), which conform to equation (2). The coordinate values differ from equation (2) because green pixels are present at positions (i+u, j+m), where u is an even integer and m is an odd integer, and at positions (i+n, j+v), where n is an odd integer and v is an even integer.

$$R(i+u, j+m) = \quad (5)$$
$$G(i+u, j+m) + (RNF(i+u, j+m) - GNF(i+u, j+m))$$

$$R(i+n, j+v) = \quad (6)$$
$$\{G(i+n, j+v) + (RNF(i+n, j+v) - GNF(i+n, j+v))$$

FIG. 30 shows the two-dimensional positions of the red signals rg obtained at green pixel positions by interpolation according to equations (5) and (6).

RNF and GNF in equations (5) and (6) are the values (FIGS. 6 and 7) calculated by nonlinear low-pass filters 8r and 8g in FIG. 1, but GNF may be recalculated using the gr and gb values calculated in steps S1 and S2. In that case, the gr and gb values calculated by the calculating means 10 are output to two-dimensional memory 6g as shown in FIG. 1 and stored temporarily therein, and are then recalculated in nonlinear low-pass filter 8g.

Next comes the calculation process in step S4. In this step, blue signals missing at green pixel positions are interpolated. The blue signal at a green pixel position is calculated from the following equations (7) and (8), which conform to equation (2). The coordinate values differ from equation (2) because green pixels are present at positions (i+u, j+m), where u is an even integer and m is an odd integer, and positions (i+n, j+v), where n is an odd integer and v is an even integer.

$$B(i+u, j+m) = \quad (7)$$
$$\{G(i+u, j+m) + (BNF(i+u, j+m) - GNF(i+u, j+m))$$

$$B(i+n, j+v) = \quad (8)$$
$$\{G(i+m, j+v) + (BNF(i+n, j+v) - GNF(i+n, j+v))$$

FIG. 31 shows the two-dimensional positions of the blue signals bg obtained at green pixel positions by interpolation according to equations (7) and (8).

BNF and GNF in equations (7) and (8) are the values calculated by nonlinear low-pass filters 8g and 8b in FIG. 1, but GNF may be recalculated using the gr and gb values calculated in steps S1 and S2.

In that case, the gr and gb values calculated by the calculating means 10 are output to two-dimensional memory 6g as shown in FIG. 1 and stored temporarily therein, and are then recalculated in nonlinear low-pass filter 8g.

Next comes the calculation process in step S5. In this step, red signals missing at blue pixel positions are interpolated. The red signal at a blue pixel position is calculated from the following equation (9), which conforms to equation (2). The coordinate values differ from equation (2) because blue pixels are present at positions (i+u, j+t), where u and t are even integers.

$$R(i+u, j+v) = \quad (9)$$
$$\{G(i+u, j+v) + (RNF(i+u, j+v) - GNF(i+u, j+v))$$

FIG. 32 shows the two-dimensional positions of the red signals rb obtained at blue pixel positions by interpolation according to equation (9). FIG. 32 also shows the red signals rg obtained at green pixel positions by interpolation according to equations (5) and (6). As a result of interpolation according to equations (5), (6), and (9), red signals are obtained for all the pixels.

RNF and GNF in equation (9) are the values calculated by low-pass filter 8r in FIG. 1, but GNF may be recalculated using the gr and gb values calculated in steps S1 and S2. RNF may also be recalculated using the rg values calculated in step S3.

Next comes the calculation process in step S6. In this step, blue signals missing at red pixel positions are interpolated. The blue signal at a red pixel position is calculated from the following equation (10), which conforms to equation (2). The coordinate values differ from equation (2) because red pixels are present at positions (i+n, j+m), where n and m are odd integers.

$$B(i+n, j+m) = \quad (10)$$
$$G(i+n, j+m) + (BNF(i+n, j+m) - GNF(i+n, j+m))$$

FIG. 33 shows the two-dimensional positions of the blue signals br obtained at red pixel positions by interpolation according to equation (10). FIG. 33 also shows the blue signals bg obtained at green pixel positions by interpolation according to equations (7) and (8). As a result of interpolation according to equations (7), (8), and (10), blue signals are obtained for all the pixels.

BNF and GNF in equation (10) are the values calculated by nonlinear low-pass filters 8g and 8b in FIG. 1, but GNF may be recalculated using the gr and gb values calculated in steps S1 and S2. BNF may also be recalculated using the interpolated bg values calculated in step S4.

From the calculations in steps S1 to S6 above, the color signals missing at each pixel can be interpolated and red, green, blue signals can be obtained for all the pixels.

When interpolation is carried out by the above method, pixel interpolation using correlation can be carried out when the red, green, and blue signals are mutually correlated, but accurate pixel interpolation can also be carried out even at locations such as edges where the color signals are uncorrelated.

It can be readily appreciated that the color signals can be generated in any appropriate order, not limited to the order indicated in FIG. 24. For example, the order of calculation can be reversed between steps S1 and S2, steps S3 and S4, and steps S5 and S6.

The equations in this embodiment express two-dimensional filtering by the nonlinear low-pass filters, but it is possible to determine the degree of correlation among the output signals neighboring the pixel of interest and perform filtering by use only of the output signals of pixels aligned in a direction of strong correlation.

From considerations of image processing speed, the pixel interpolation calculations performed in the calculating means 10 as shown in equations (3) to (10) are normally configured in hardware, but this is not a restriction; the calculations may be implemented in software if processing time permits.

SECOND EMBODIMENT

Figure 34:
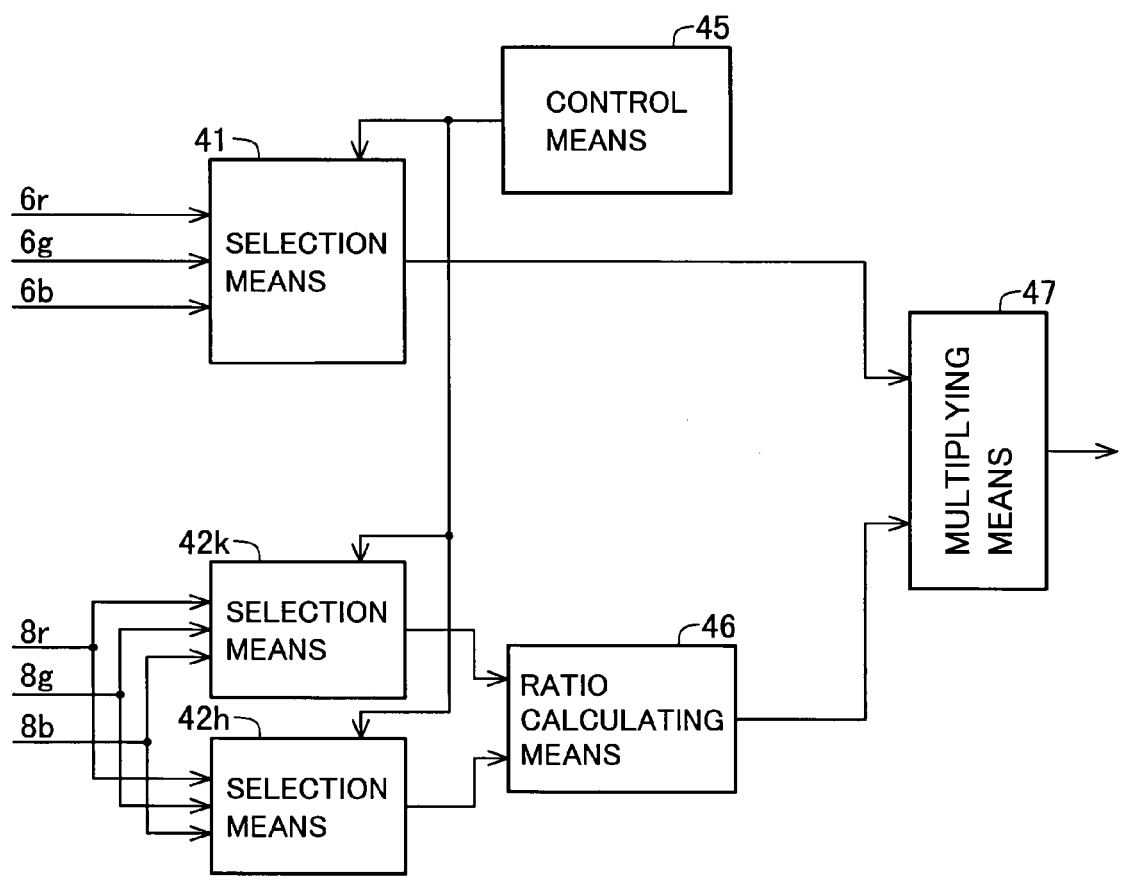
FIG. 34 is a block diagram showing the structure of the calculating means in the second embodiment.

Next, image signal processing apparatus according to a second embodiment will be described. The overall structure of an imaging device equipped with the image signal processing device according to the second embodiment is as shown in FIG. 1, but the internal structure of the calculating means 10 is different. FIG. 34 shows the structure of the calculating means according to the second embodiment. The calculating means shown in FIG. 34 is similar to that shown in FIG. 22, except that it has a ratio calculating means 46 instead of difference calculating means 43 in FIG. 22, and a multiplying means 47 instead of the adding means 44.

The ratio calculating means 46 calculates the ratio kNF/hNF between the k-th nonlinear low-pass filtered signal kNF selected by selection means 42k and the h-th nonlinear low-pass filtered signal hNF selected by selection means 42h.

The multiplying means 47 multiplies the pixel signal h output from selection means 41 by the output (kNF/hNF of the ratio calculating means 46, and outputs the product h×(kNF−hNF). The output of the multiplying means 47 is used as the color component value (interpolated value) of the k-th color of the pixel to be interpolated.

The selection means 41, ratio calculating means 46, and multiplying means 47 constitute an interpolated value calculating means which calculates the pixel signal (interpolated value) of the k-th color at the pixel position to be interpolated, based on the pixel signal of the h-th color at that position, and the ratio (kNF/hNF) of the nonlinear low-pass filter outputs. More particularly, the interpolated value calculating means multiplies a pixel signal of one color (the h-th color) at the pixel position to be interpolated by the ratio (kNF/hNF) calculated by the ratio calculating means 46 to calculate a pixel signal of another color (the k-th color) at the pixel position to be interpolated.

The interpolated value calculated by the interpolated value calculating means is stored in the two-dimensional memory (6r, 6g, or 6b) for the pixel signal of the k-th color. Alternatively, the value is output from the output terminal 11.

Like the first embodiment, the second embodiment can perform accurate interpolation even in an area in which there is no similarity relationship between the aspect of variation in the color component values in a neighborhood of the pixel to be interpolated, and can always perform interpolation by the optimal interpolation method, irrespective of the way in which the color component values vary in the neighborhood of the pixel to be interpolated. The interpolation calculation carried out by the above calculating means 10 is expressed by the following equation (11).

$$k(i,j)=h(i,j) \times kNF(i,j)/hNF(i,j) \qquad (11)$$

In equation (11), as in equation (2), k(i, j) is a missing color signal at position (i, j) on the image sensor 2, that is, a color signal to be interpolated; h(i, j) is a color signal already present at position (i, j), that is, a color signal with a known value. kNF and hNF are the output values of nonlinear low-pass filters, calculated by predetermined methods from the k and h signals at pixel position (i, j) and pixel positions in its neighborhood. The nonlinear low-pass filtered values are obtained from the nonlinear low-pass filters 8r, 8g, 8b in FIG. 1.

The meaning of the calculation shown in equation (11) will be described with reference to FIGS. 35, 36, 37, and 38, which show the color signal levels of the pixels and their positions on the image sensor 2. For simplicity, only one row of the image sensor 2 and only one-dimensional calculations are illustrated. The band at the top shows the arrangement of color filters, where h represents an h pixel, k represents a k pixel, and the expressions in parentheses are coordinates indicating pixel positions. Curve a represents true values of the k signal, while the curve b represents true values of the h signal. The black dots on curves a and b represent pixel signal values of the k and h signals which are output from the image sensor 2. Curves c and d represent low-pass filtered values of the k and h signals. A method of pixel interpolation of the k signal at pixel position (i, j) will be described with reference to these drawings.

Figure 35:
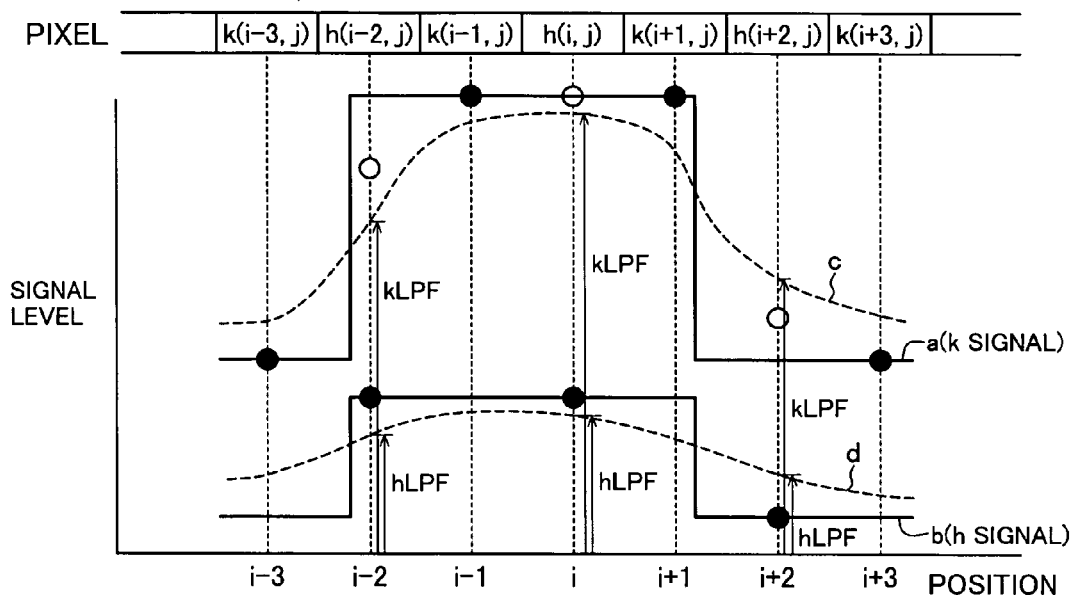
FIG. 35 schematically illustrates the principle of pixel interpolation in the prior art for a case of low correlation between the k and h signals.
Figure 36:
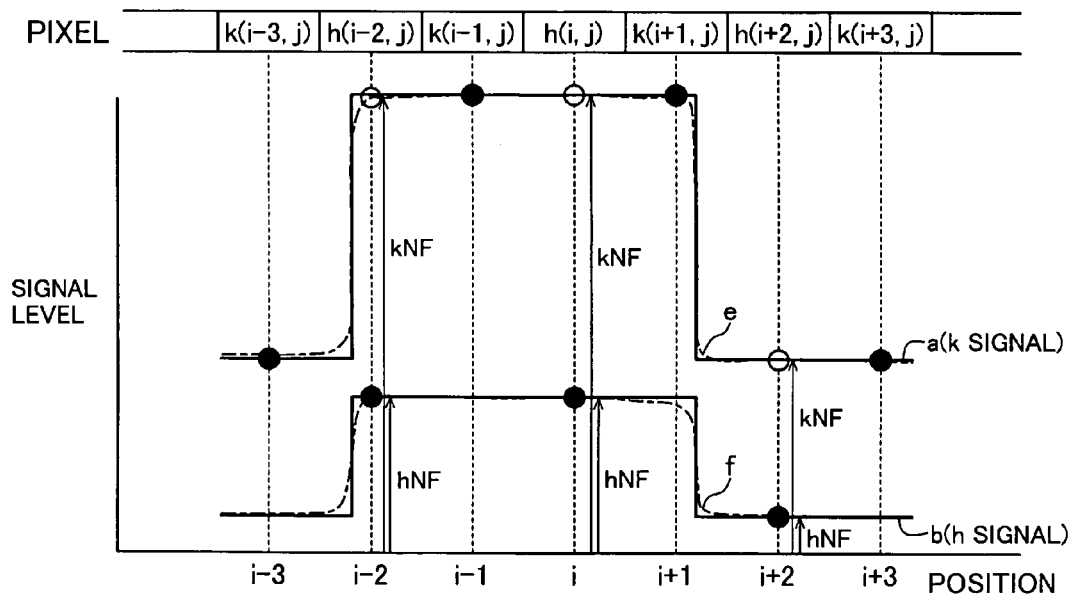
FIG. 36 schematically illustrates the principle of pixel interpolation in the first embodiment for a case of low correlation between the k and h signals.
Figure 37:
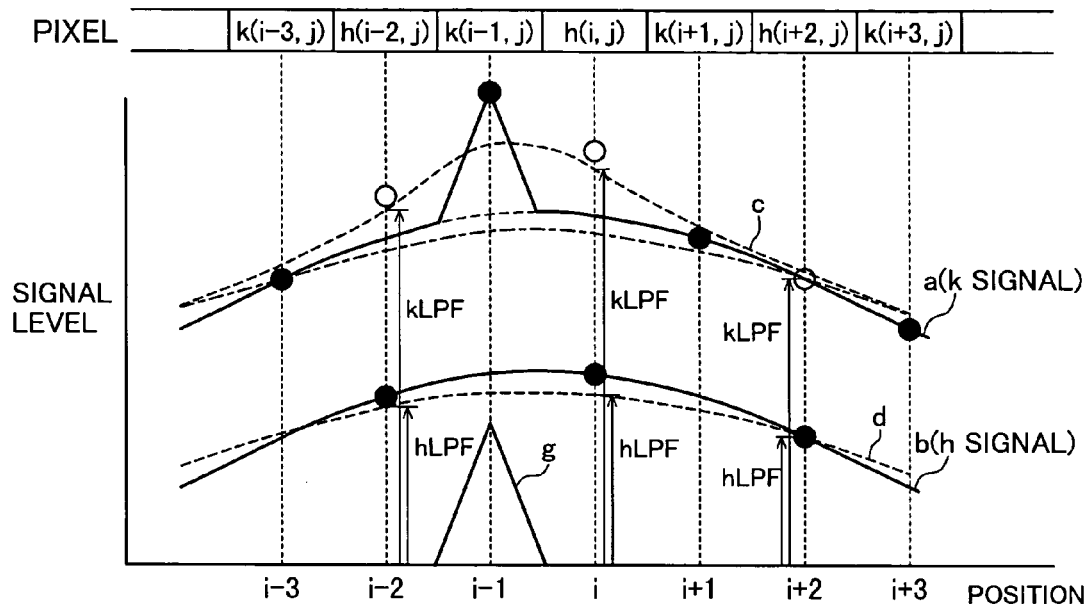
FIG. 37 schematically illustrates the principle of pixel interpolation in the prior art for a case of low correlation between the k and h signals.
Figure 38:
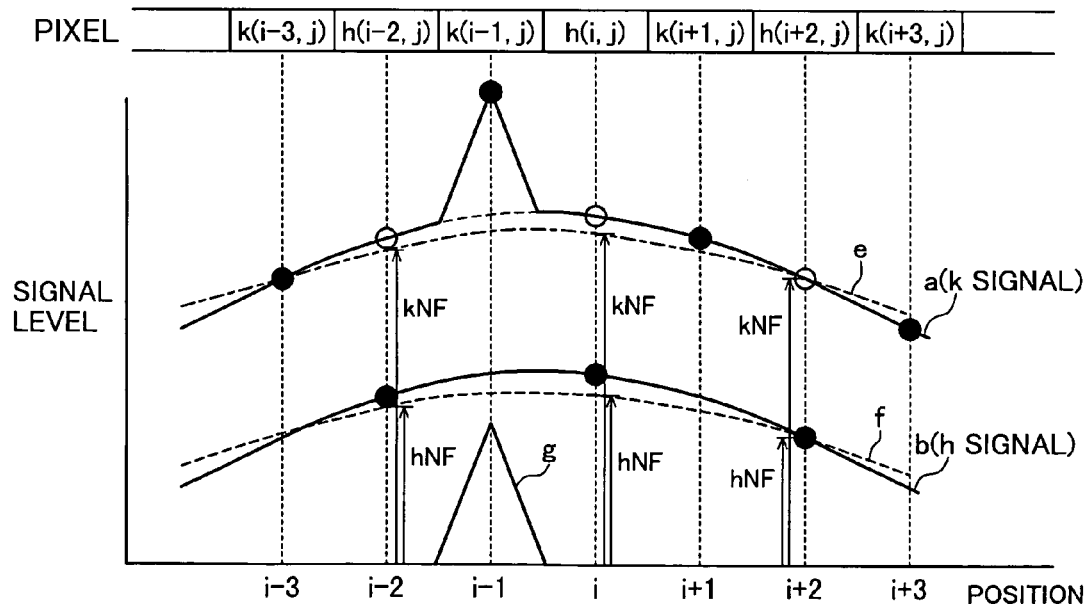
FIG. 38 schematically illustrates the principle of pixel interpolation in the first embodiment for a case of low correlation between the k and h signals.

FIGS. 35 and 36 show a case in which the k and h signals vary according to convex curves having different profiles, while FIGS. 37 and 38 shows a case in which pixel signals are contaminated by noise. FIGS. 35 and 37 show the result of conventional interpolation, while FIGS. 36 and 38 show the result of interpolation by the method according to this embodiment.

As might have been mentioned in the description of the first embodiment, there is a strong correlation between the signal variations in localized areas of an image. Therefore, the low-pass filtered values, which indicate gradual variations in the signals, are related to the signal values by the following equation (12).

$$k(i,j):h(i,j)=kNF(i,j):hNF(i,j) \qquad (12)$$

From equation (12), the signal k(i, j) at an h pixel position (i, j) can be expressed by the following equation (13).

$$k(i,j)=h(i,j) \times kNF(i,j)/hNF(i,j) \qquad (13)$$

Equation (13) rests on the assumption of strongly correlated signal variations in a localized image area. This assumption is true for most areas in an image. Highly accurate pixel interpolation is possible in areas with a strong positive correlation between signal variations. In areas having no correlation, such as at edges, or in areas having negative correlation, pixel interpolation error may occur as described in the first embodiment.

In FIG. 35, the k and h signals vary according to convex curves having different profiles. Color signals at edges in an image or at places showing significant color change in an image often have this type of signal waveform. In this case, the degree of correlation between the two signals is low. Curve c in FIG. 35 represents the linear low-pass filtered output kLPF, while curve d represents the linear low-pass filtered output hLPF. As there is only a weak correlation between the signals, the signal waveforms of kLPF and hLPF have different shapes and lack similarity. Therefore, as represented by the white circles, interpolation error may be introduced in the k signal interpolated according to the conventional method at edges with signal variation such as position h(i−2, j) or h(i+2, j).

In the pixel interpolation method according to this embodiment, the values obtained from the nonlinear low-pass filters 8r, 8g, 8b are used for pixel interpolation. FIG. 36 shows an example. In the nonlinear low-pass filters shown in FIGS. 10 and 11, when there is large signal variation, the signal at the position for which a filtered value is being calculated is substituted for greatly differing values. Therefore, the output waveform has a form that tracks abrupt signal variations, as represented by curves e and f in FIG. 36. In the drawing, curve e is the nonlinear low-pass filtered output kNF of the k signal, while curve f is the nonlinear low-pass filtered output hNF of the h signal. The pixel values calculated according to equation (12) are represented by the white circles in FIG. 36, which demonstrate accurate interpolation, having values substantially identical to the true values. As described, by calculating correlation between color signals from the output values of the nonlinear low-pass filters, highly accurate interpolation can be carried out.

Next, another example will be described. FIGS. 37 and 38 show examples of pixel interpolation for a case in which the signals are contaminated with noise. FIG. 37 shows an example of pixel interpolation according to the conventional method. Noise is assumed to have occurred at pixel position (i−1, j). This noise is added to the k signal, thus, the k signal has noise at position (i−1, j). The linear low-pass filtered value kLPF of the k signal is represented by curve c in FIG. 25, which has a signal waveform containing signal variation due to noise. Curve d represents the low-pass filtered output hLPF of the h signal. The interpolated pixel value of the k signal, which is obtained by the calculation according to equation (13), is represented by a white circles. As kLPF suffers from noise, the interpolated pixel values at positions (i−2, j) and (i, j) have values different than the true values, and show aggravated error introduced by noise. Therefore, when using linear low-pass filter output value, the noise added to a signal may influence the pixel interpolation.

FIG. 38 shows an example of pixel interpolation according to this embodiment. In this figure, curve e represents the nonlinear low-pass filtered value kNF of k signal, while curve f represents the nonlinear low-pass filtered value hNF. As in FIG. 37, noise is added to the k signal at pixel position (i−1, j). In the nonlinear low-pass filter shown in FIGS. 10 and 11, interpolation is carried out by use of the signal at the position to be calculated as is instead of using the low-pass filtered value, a low frequency signal component which is free from significant variation in signal in a narrow range can be obtained as shown in the k signal in FIG. 38. As represented by the white circles in FIG. 26, which are calculated according to equation (11), the interpolated values are substantially identical to the true values. Thus, highly accurate interpolation can be carried out even when noise is added to a signal.

The pixel interpolation calculations are carried out according to the flowchart shown in FIG. 27, as in the first embodiment. The calculation of the interpolated values includes six processes, as shown in FIG. 27. When all six processes have been completed, pixel signals are present for the missing colors at all pixels positions on one screen.

The specific calculation in each step will now be described. First, nonlinear low-pass filter outputs for the red, green, and blue signals are calculated as in the first embodiment.

First, the calculation process in step S1 will be described. The NF outputs of the green signals are calculated by nonlinear low-pass filter 8g shown in FIG. 1, and the calculated results are input to the calculating means 10.

Similarly, the NF outputs of the red signals are calculated by nonlinear low-pass filter 8r in FIG. 1 and the calculated results are input to the calculating means 10.

The green signal at a red pixel position is calculated from the following equation (14), which conforms to equation (11). The coordinate values differ from equation (11) because red pixels are present at positions (i+n, j+m), where m and n are odd integers.

$$G(i+n, j+m) = \\ R(i+n, j+m) + \times (GNF(i+n, j+m)/RNF(i+n, j+m)) \quad (14)$$

FIG. 28 shows the two-dimensional positions of the green signals gr obtained at red pixel positions by interpolation according to equation (14).

Next comes the calculation process in step S2. In this step, green signals missing at blue pixel positions are interpolated. The NF outputs of the blue signals are calculated by nonlinear low-pass filter 8b in FIG. 1 and the calculated results are input to the calculating means 10. The green signal at a blue pixel position is calculated from the following equation (15), which conforms to equation (11). The coordinate values differ from equation (11) because blue pixels are present at positions (i+u, j+v), where u and v are even integers.

$$G(i+u, j+v) = \\ B(i+u, j+v) \times (GNF(i+u, j+v)/BNF(i+u, j+v)) \quad (15)$$

FIG. 29 shows green signals gb obtained at blue pixel positions by interpolation according to equation (15). FIG. 19 also shows the signals gr obtained by interpolation according to equation (14). Green signals at all pixel positions can be obtained by green signal interpolation at red pixel positions according to equation (14) and green signal interpolation at blue pixel positions according to equation (15). The two-dimensional arrangement of green signals interpolated at blue pixel positions by equation (15) is shown by the gb notation in FIG. 19. Green signals have now been calculated at all pixel positions.

Next comes the calculation process in step S3. In this step, red signals missing at green pixel positions are interpolated. The red signal at a green pixel position is calculated from the following equations (27) and (28), which conform to equation (11). The coordinate values differ from equation (11) because green pixels are present at positions (i+n, j+v), where n is an odd integer and v is an even integer.

$$R(i+u, j+m) = \\ G(i+u, j+m) \times (RNF(i+u, j+m)/GNF(i+u, j+m)) \quad (16)$$

$$R(i+n, j+v) = \\ G(i+n, j+v) \times (RNF(i+n, j+v)/GNF(i+n, j+v)) \quad (17)$$

FIG. 30 shows the two-dimensional positions of the red signals rg obtained at green pixel positions by interpolation according to equations (16) and (17).

RNF and GNF in equations (16) and (17) are the values (FIGS. 6 and 7) calculated by nonlinear low-pass filters 8r and 8g in FIG. 1, but GNF may be recalculated using the gr and gb values calculated in steps S1 and S2. In that case, the gr and gb values calculated by the calculating means 10 are output to two-dimensional memory 6g as shown in FIG. 1 and stored temporarily therein, and are then recalculated in nonlinear low-pass filter 8g.

Next comes the calculation process in step S4. In this step, blue signals missing at green pixel positions are interpolated. The blue signal at a green pixel position is calculated from the following equations (18) and (19), which conform to equation (11). The coordinate values differ from equation (11) because green pixels are present at positions (i+u, j+m), where u is an even integer and m is an odd integer, and (i+n, j+v), where n is an odd integer and v is an even integer.

$$B(i+u, j+m) = \\ G(i+u, j+m) \times (BNF(i+u, j+m)/GNF(i+u, j+m)) \quad (18)$$

$$B(i+n, j+v) = \\ G(i+n, j+v) \times (BNF(i+n, j+v)/GNF(i+n, j+v)) \quad (19)$$

FIG. 31 shows the two-dimensional positions of the blue signals bg obtained at green pixel positions by interpolation according to equations (18) and (19).

BNF and GNF in equations (18) and (19) are the values (FIGS. 7 and 8) calculated by nonlinear low-pass filters 8g and 8b in FIG. 1, but GNF may be recalculated using the gr and gb values calculated in steps S1 and S2.

In that case, the gr and gb values calculated by the calculating means 10 are output to two-dimensional memory 6g as shown in FIG. 1 and stored temporarily therein, and are then recalculated in nonlinear low-pass filter 8g.

Next comes the calculation process in step S5. In this step, red signals missing at blue pixel positions are interpolated. The red signal at a blue pixel position is calculated from the following equation (20), which conforms to equation (11). The coordinate values differ from equation (11) because blue pixels are present at positions (i+u, j+v), where u and v are even integers.

$$R(i+u, j+v) = \quad (20)$$
$$G(i+u, j+v) \times (RNF(i+u, j+v)/GNF(i+u, j+v))$$

FIG. 32 shows the two-dimensional positions of the red signals rb obtained at blue pixel positions by interpolation according to equation (20). FIG. 32 also shows the red signals rg obtained at green pixel positions by interpolation according to equations (16) and (17). Red signals for all the pixels are obtained by interpolation according to equations (16), (17) and (20).

RNF and GNF in equation (20) are the values (FIGS. 6 and 7) calculated by nonlinear low-pass filters 8r and 8g in FIG. 1, but GNF may be recalculated using the gr and gb values calculated in steps S1 and S2. RNF may also be recalculated using the rg values calculated in step S3.

Next comes the calculation process in step S6. In this step, blue signals missing at red pixel positions are interpolated. The blue signal at a red pixel position is calculated from the following equation (21), which conforms to equation (11). The coordinate values differ from equation (11) because red pixels are present at positions (i+n, j+m), where m and n are odd integers.

$$B(i+n, j+m) = \quad (21)$$
$$G(i+n, j+m) \times (BNF(i+n, j+m)/GNF(i+n, j+m))$$

FIG. 33 shows the two-dimensional positions of the blue signals br obtained at red pixel positions by interpolation according to equation (33). FIG. 33 also shows the blue signals bg obtained by interpolation according to equations (18) and (19). Blue signals for all the pixels can be obtained by interpolation according to equations (18), (19) and (21).

BNF and GNF in equation (21) are the values (FIGS. 7 and 8) calculated by nonlinear low-pass filters 8g and 8b in FIG. 1, but GNF may be recalculated using the gr and gb values calculated in steps S1 and S2. BNF may also be recalculated using the bg values calculated in step S4.

From the calculations in steps S1 to S6 above, the color signals missing at each pixel can be interpolated and red, green, blue signals can be obtained for all the pixels.

When interpolation is carried out by methods described above, pixel interpolation using correlation can be carried out when the red, green, and blue signals are correlated, but accurate pixel interpolation can also be carried out even at locations such as edges where the color signals are correlated weakly or not correlated at all.

It can be readily appreciated that the color signals can be generated in any appropriate order, not limited to the order indicated in FIG. 24. For example, the order of calculation can be reversed between steps S1 and S2, steps S3 and S4, and steps S5 and S6.

The equations in this embodiment express two-dimensional filtering by the nonlinear low-pass filters, but it is possible to determine the degree of correlation among the output signals neighboring the pixel of interest and perform filtering by use only of the output signals of pixels aligned in a direction of strong correlation.

From considerations of image processing speed, the pixel interpolation calculations performed in the calculating means 10 as shown in equations (14) to (21) are normally configured in hardware, but this is not a restriction; the calculations may be implemented in software if processing time permits.

Although the invention has been described in the form of pixel signal processing apparatus, the methods of pixel signal processing disclosed in relation to the apparatus also constitute part of the invention.

What is claimed is:

1. A pixel signal processing apparatus for generating a pixel signal having a k-th spectral sensitivity characteristic at a pixel position of interest where there is a pixel signal having an h-th spectral sensitivity characteristic in a group of pixel signals from pixels arrayed on a two-dimensional plane, each pixel having one of a first to an N-th spectral sensitivity characteristic, h and k being different integers between 1 and N, inclusive, the pixel signal processing apparatus comprising:

a first comparison and selection means that, for each of a plurality of first neighboring pixels having the h-th spectral sensitivity characteristic, disposed in a neighborhood of the pixel position of interest, decides whether an absolute value of a first difference between its signal value and the signal value of the pixel signal of the h-th spectral sensitivity characteristic at the pixel position of interest is larger than a predetermined first threshold value, selects the signal value of the pixel signal of the h-th spectral sensitivity characteristic at the pixel position of interest if the absolute value of the first difference is larger than the first threshold value, and selects the signal value of the first neighboring pixel if the absolute value of the first difference is smaller than the first threshold value;

a first mean value calculating means for calculating a mean value of the plurality of pixel signal values selected by the first comparison and selection means;

an h-signal nonlinear low-pass filter for making a result calculated by said first mean value calculating means a low-frequency component of the pixel signal of the h-th spectral sensitivity characteristic at the pixel position of interest;

a second comparison and selection means that, for each of a plurality of second neighboring pixels having the k-th spectral sensitivity characteristic, disposed in a neighborhood of the pixel position of interest, decides whether an absolute value of a second difference between its signal value and a mean value of the signals of a plurality of pixels of the k-th spectral sensitivity characteristic adjacent to the pixel position of interest is larger than a predetermined second threshold value, selects said mean value of the signals of said plurality of pixels of the k-th spectral sensitivity characteristic if the absolute value of the second difference is greater than the second threshold value, and selects the signal value of the second neighboring pixel if the absolute value of the second difference is less than the second threshold value;

a second mean value calculating means for calculating a mean value of the signal values of the plurality of pixels selected by the second comparison and selection means;

a k-signal nonlinear low-pass filter for making a result calculated by said second mean value calculating means a low-frequency component of the pixel signal with the k-th spectral sensitivity characteristic at the pixel position of interest; and a calculating means for adding a difference between the values obtained by the k-signal nonlinear low-pass filter and the h-signal nonlinear low-pass filter to the value of the pixel signal of the h-th spectral sensitivity characteristic at the pixel position of interest to obtain the pixel signal of the k-th spectral sensitivity characteristic at the pixel position of interest.

2. The pixel signal processing apparatus of claim 1, wherein the pixels having the first to N-th spectral sensitivity characteristics are pixels of three types, namely, red, green, and blue pixels.

3. The pixel signal processing apparatus of claim 1, wherein in calculating the mean value of the plurality of pixel signal values selected by the first comparison and selection means and the second comparison and selection means, each of the first and second mean value calculating means calculates a weighted mean, using weighting coefficients that decrease with increasing distance from the pixel of interest.

4. A pixel signal processing apparatus for generating a pixel signal having a k-th spectral sensitivity characteristic at a pixel position of interest where there is a pixel signal having an h-th spectral sensitivity characteristic in a group of pixel signals from pixels arrayed on a two-dimensional plane, each pixel having one of a first to an N-th spectral sensitivity characteristic, h and k being different integers between 1 and N, inclusive, the pixel signal processing apparatus comprising:

a first comparison and selection means that, for each of a plurality of first neighboring pixels having the h-th spectral sensitivity characteristic, disposed in a neighborhood of the pixel position of interest, decides whether an absolute value of a first difference between its signal value and the signal value of the pixel signal of the h-th spectral sensitivity characteristic at the pixel position of interest is larger than a predetermined first threshold value, selects the signal value of the pixel signal of the h-th spectral sensitivity characteristic at the pixel position of interest if the absolute value of the first difference is larger than the first threshold value, and selects the signal value of the first neighboring pixel if the absolute value of the first difference is smaller than the first threshold value;

a first mean value calculating means for calculating a mean value of the plurality of pixel signal values selected by the first comparison and selection means;

an h-signal nonlinear low-pass filter for making a result calculated by said first mean value calculating means a low-frequency component of the pixel signal of the h-th spectral sensitivity characteristic at the pixel position of interest;

a second comparison and selection means that, for each of a plurality of second neighboring pixels having the k-th spectral sensitivity characteristic, disposed in a neighborhood of the pixel position of interest, decides whether an absolute value of a second difference between its signal value and a mean value of the signals of the plurality of pixels of the k-th spectral sensitivity characteristic adjacent to the pixel position of interest is larger than a predetermined second threshold value, selects said mean value of the signals of said plurality of pixels of the k-th spectral sensitivity characteristic if the absolute value of the second difference is greater than the second threshold value, and selects the signal value of the second neighboring pixel if the absolute value of the second difference is less than the second threshold value;

a second mean value calculating means for calculating a mean value of the signal values of the plurality of pixels selected by the second comparison and selection means;

a k-signal nonlinear low-pass filter for making a result calculated by said second mean value calculating means a low-frequency component of the pixel signal with the k-th spectral sensitivity characteristic at the pixel position of interest; and a calculating means for multiplying the value of the pixel signal of the h-th spectral sensitivity characteristic at the pixel position of interest by a ratio of the values obtained by the k-signal nonlinear low-pass filter and the h-signal nonlinear low-pass filter to obtain the pixel signal of the k-th spectral sensitivity characteristic at the pixel position of interest.

5. The pixel signal processing apparatus of claim 4, wherein the pixels having the first to N-th spectral sensitivity characteristics are pixels of three types, namely, red, green, and blue pixels.

6. The pixel signal processing apparatus of claim 4, wherein in calculating the mean value of the plurality of pixel signal values selected by the first comparison and selection means and the second comparison and selection means, each of the first and second mean value calculating means calculates a weighted mean, using weighting coefficients that decrease with increasing distance from the pixel of interest.

7. A pixel signal processing method for generating a pixel signal having a k-th spectral sensitivity characteristic at a pixel position of interest where there is a pixel signal having an h-th spectral sensitivity characteristic in a group of pixel signals from pixels arrayed on a two-dimensional plane, each pixel having one of a first to an N-th spectral sensitivity characteristic, h and k being different integers between 1 and N, inclusive, the pixel signal processing method comprising:

a first comparison and selection step of, for each of a plurality of first neighboring pixels having the h-th spectral sensitivity characteristic, disposed in a neighborhood of the pixel position of interest, deciding, by utilizing a first comparison and selection means, whether an absolute value of a first difference between its signal value and the signal value of the pixel signal of the h-th spectral sensitivity characteristic at the pixel position of interest is larger than a predetermined first threshold value, selecting the signal value of the pixel signal of the h-th spectral sensitivity characteristic at the pixel position of interest if the absolute value of the first difference is larger than the first threshold value, and selecting the signal value of the first neighboring pixel if the absolute value of the first difference is smaller than the first threshold value;

a first mean value calculation step of calculating a mean value of the plurality of pixel signal values selected in the first comparison and selection step;

an h-signal nonlinear low-pass filtering step of making a result calculated in said first mean value calculation step a low-frequency component of the pixel signal of the h-th spectral sensitivity characteristic at the pixel position of interest;

a second comparison and selection step of, for each of a plurality of second neighboring pixels having the k-th spectral sensitivity characteristic, disposed in a neighborhood of the pixel position of interest, deciding whether an absolute value of a second difference between its signal value and a mean value of the signals of the plurality of pixels of the k-th spectral sensitivity characteristic adjacent to the pixel position of interest is larger than a predetermined second threshold value, selecting the mean value of the signals of said plurality of pixels having the k-th spectral sensitivity characteristic if the absolute value of the second difference is greater than the second threshold value, and selecting the signal value of the second neighboring pixel if the absolute value of the second difference is less than the second threshold value;

a second mean value calculation step of calculating a mean value of the signal values of the plurality of pixels selected by the second comparison and selection step;

a k-signal nonlinear low-pass filtering step of making a result calculated in said second mean value calculation step a low-frequency component of the pixel signal with the k-th spectral sensitivity characteristic at the pixel position of interest; and a calculation step of adding a difference between the values obtained by the k-signal nonlinear low-pass filter and the h-signal nonlinear low-pass filter to the value of the pixel signal of the h-th spectral sensitivity characteristic at the pixel position of interest to obtain the pixel signal of the k-th spectral sensitivity characteristic at the pixel position of interest.

8. The pixel signal processing method of claim 7, wherein the pixels having the first to N-th spectral sensitivity characteristics are pixels of three types, namely, red, green, and blue pixels.

9. The pixel signal processing method of claim 7, wherein in calculating the mean value of the plurality of pixel signal values selected in the first comparison and selection step and the second comparison and selection step, each of the first and second mean value calculation steps calculates a weighted mean, using weighting coefficients that decrease with increasing distance from the pixel of interest.

10. A pixel signal processing method for generating a pixel signal having a k-th spectral sensitivity characteristic at a pixel position of interest where there is a pixel signal having an h-th spectral sensitivity characteristic in a group of pixel signals from pixels arrayed on a two-dimensional plane, each pixel having one of a first to an N-th spectral sensitivity characteristic, h and k being different integers between 1 and N, inclusive, the pixel signal processing method comprising:

a first comparison and selection step of, for each of a plurality of first neighboring pixels having the h-th spectral sensitivity characteristic, disposed in a neighborhood of the pixel position of interest, deciding, by utilizing a first comparison and selection means, whether an absolute value of a first difference between its signal value and the signal value of the pixel signal of the h-th spectral sensitivity characteristic at the pixel position of interest is larger than a predetermined first threshold value, selecting the signal value of the pixel signal of the h-th spectral sensitivity characteristic at the pixel position of interest if the absolute value of the first difference is larger than the first threshold value, and selecting the signal value of the first neighboring pixel if the absolute value of the first difference is smaller than the first threshold value;

a first mean value calculation step of calculating a mean value of the plurality of pixel signal values selected in the first comparison and selection step;

an h-signal nonlinear low-pass filtering step of making a result calculated in said first mean value calculation step a low-frequency component of the pixel signal of the h-th spectral sensitivity characteristic at the pixel position of interest;

a second comparison and selection step of, for each of a plurality of second neighboring pixels having the k-th spectral sensitivity characteristic, disposed in a neighborhood of the pixel position of interest, deciding whether an absolute value of a second difference between its signal value and a mean value of the signals of a plurality of pixels of the k-th spectral sensitivity characteristic adjacent to the pixel position of interest is larger than a predetermined second threshold value, selecting the mean value of the signals of said plurality of pixels having the k-th spectral sensitivity characteristic if the absolute value of the second difference is greater than the second threshold value, and selecting the signal value of the second neighboring pixel if the absolute value of the second difference is less than the second threshold value;

a second mean value calculation step of calculating a mean value of the signal values of the plurality of pixels selected in the second comparison and selection step;

a k-signal nonlinear low-pass filtering step of making a result calculated in said second mean value calculation step a low-frequency component of the pixel signal with the k-th spectral sensitivity characteristic at the pixel position of interest; and a calculation step of multiplying the value of the pixel signal of the h-th spectral sensitivity characteristic at the pixel position of interest by a ratio of the values obtained by the k-signal nonlinear low-pass filtering step and the h-signal nonlinear low-pass filtering step to obtain the pixel signal of the k-th spectral sensitivity characteristic at the pixel position of interest.

11. The pixel signal processing method of claim 10, wherein the pixels having the first to N-th spectral sensitivity characteristics are pixels of three types, namely, red, green, and blue pixels.

12. The pixel signal processing method of claim 10, wherein in calculating the mean value of the plurality of pixel signal values selected in the first comparison and selection step and the second comparison and selection step, each of the first and second mean value calculation steps calculates a weighted mean, using weighting coefficients that decrease with increasing distance from the pixel of interest.

* * * * *